US012630480B2

(12) United States Patent (10) Patent No.: US 12,630,480 B2
Singh et al. (45) Date of Patent: May 19, 2026

(54) METHOD FOR MAKING MAX PHASE COMPOSITES

(71) Applicant: UCHICAGO ARGONNE, LLC, Chicago, IL (US)

(72) Inventors: Dileep Singh, Naperville, IL (US); Beihai Ma, Naperville, IL (US)

(73) Assignee: UCHICAGO ARGONNE, LLC, Chicago, IL (US)

(*) Notice: Subject to any disclaimer, the term of this patent is extended or adjusted under 35 U.S.C. 154(b) by 243 days.

(21) Appl. No.: 18/420,051

(22) Filed: Jan. 23, 2024

(65) Prior Publication Data

US 2024/0327294 A1     Oct. 3, 2024

Related U.S. Application Data

(60) Provisional application No. 63/481,591, filed on Jan. 25, 2023.

(51) Int. Cl.
C04B 35/56          (2006.01)
C04B 35/626         (2006.01)
          (Continued)

(52) U.S. Cl.
CPC ...... C04B 35/5618 (2013.01); C04B 35/6262 (2013.01); C04B 35/62655 (2013.01);
          (Continued)

(58) Field of Classification Search
CPC ............ C04B 35/5618; C04B 35/6262; C04B 35/62655; C04B 35/62675;
          (Continued)

(56) References Cited

U.S. PATENT DOCUMENTS 5,942,455 A  *  8/1999  Barsoum ............. C04B 35/6455
                                                          501/91
2010/0055492 A1     3/2010  Barsoum et al.
2017/0057879 A1*    3/2017  Harris ................. C04B 35/5618

FOREIGN PATENT DOCUMENTS

CA          2939288 A1     2/2017
CN          104628407 B    1/2017

OTHER PUBLICATIONS

Barsoum, The Mn+1AXn Phases: A New Class of Solids: Thermodynamically Stable Nanolaminates, Prog. Solid State Chem., 28: 201-81 (2000).

(Continued)

*Primary Examiner* — Ricardo D Morales
(74) *Attorney, Agent, or Firm* — MARSHALL, GERSTEIN & BORUN LLP

(57)          ABSTRACT

A method of forming a MAX Phase composite can include forming a precursor powder into a discrete shape to thereby form a green body; heating the green body at a pre-sintering temperature to partially reduce the oxide present in the green body to thereby form a pre-sintered preform; and performing reactive infiltration by heating the pre-sintered preform in the presence of an infiltrating material comprising an A-group element to an infiltration temperature suitable for transforming the infiltrating material to a molten state, wherein the molten infiltrating material reacts with the pre-sintered preform to thereby form the MAX Phase composite.

20 Claims, 29 Drawing Sheets

(51) Int. Cl.
| | |
|---|---|
| *C04B 35/628* | (2006.01) |
| *C04B 35/65* | (2006.01) |
| *C04B 35/657* | (2006.01) |

(52) U.S. Cl.
CPC .. *C04B 35/62675* (2013.01); *C04B 35/62842* (2013.01); *C04B 35/65* (2013.01); *C04B 35/657* (2013.01); *C04B 2235/3217* (2013.01); *C04B 2235/3232* (2013.01); *C04B 2235/3839* (2013.01); *C04B 2235/402* (2013.01); *C04B 2235/425* (2013.01); *C04B 2235/6021* (2013.01); *C04B 2235/6026* (2013.01); *C04B 2235/604* (2013.01); *C04B 2235/616* (2013.01); *C04B 2235/656* (2013.01); *C04B 2235/664* (2013.01)

(58) Field of Classification Search
CPC . C04B 35/62842; C04B 35/65; C04B 35/657; C04B 2235/3217; C04B 2235/3232; C04B 2235/3839; C04B 2235/402; C04B 2235/425; C04B 2235/6021; C04B 2235/6026; C04B 2235/604; C04B 2235/616; C04B 2235/656; C04B 2235/664; C04B 2235/6567; C04B 2235/9607; C04B 35/6261; C04B 2235/3843; C04B 2235/5436; C04B 2235/6562; C04B 2235/6565; C04B 2235/77; C04B 2235/80; C04B 2235/94; C04B 2235/96; C04B 2235/9623; C22C 1/1057; C22C 29/005; C22C 29/06; C22C 29/16; B22F 3/26; B22F 3/15; B22F 5/10; B22F 2302/10; B22F 2302/20; B22F 2302/40
See application file for complete search history.

(56) References Cited

OTHER PUBLICATIONS

Fu et al., MAX Phases as Nanolaminate Materials: Chemical Composition, Microstructure, Synthesis, Properties, and Applications, Advanced Engineering Materials, 23(4): 2001191 (Apr. 2021).

Gao et al., Dense Ti3SiC2 prepared by reactive Hip, J. Mater. Sci., 34: 3485-3492 (1999).

He et al., Ti3ALC2—AL2O3—TiAl3 composite fabricated by reactive melt infiltration, Trans. Nonferrous Met. Soc. China, 19: 1215-1221 (2009).

Lopacinski et al., Synthesis of Ternary Titanium Aluminum Carbides Using Self-Propagating High-Temperature Synthesis Technique, J. Am. Ceram. Soc., 84: 3051-53 (2001).

Ma et al., Fabrication of MAX-Phase-Based Ceramics by Three-Dimensional Printing, J. Ceram. Sci. Tech., 6: 87-94 (2015).

Ma et al., Near-Net-Shape Fabrication of Ti3SiC2-based Ceramics by Three-Dimensional Printing, Int. J. Appl. Ceram. Technol., 12: 71-80 (2015).

Qian et al., Electrical and Thermal Properties of Ti3AlC2 at High Temperature, J. Ceram. Sci. Tech., 02: 155-158 (2011).

U.S. Department of Energy, Power Tower System Concentrating Solar-Thermal Power Basics. Retrieved from the Internet at: <URL:https://www.energy.gov/eere/solar/power-tower-system-concentrating-solar-thermal-power-basics> (2024).

Yin et al., Near-Net-Shape Fabrication of Ti3AlC2-Based Composites, Int. J. Appl. Ceram. Technol., 4: 184-190 (2007).

Yin et al., Three-Dimensional Printing of Nanolaminated Ti3AlC2Toughened TiAl3—Al2O3 Composites, J. Am. Ceram. Soc., 90: 2128-2134 (2007).

* cited by examiner

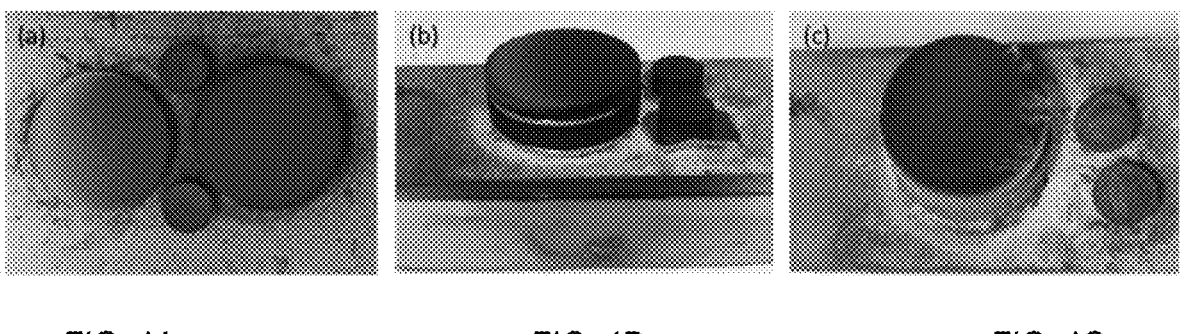
FIG. 4A FIG. 4B FIG. 4C
Top surface Bottom surface
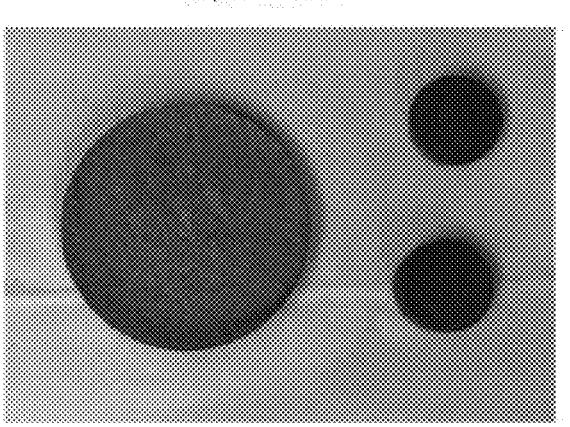 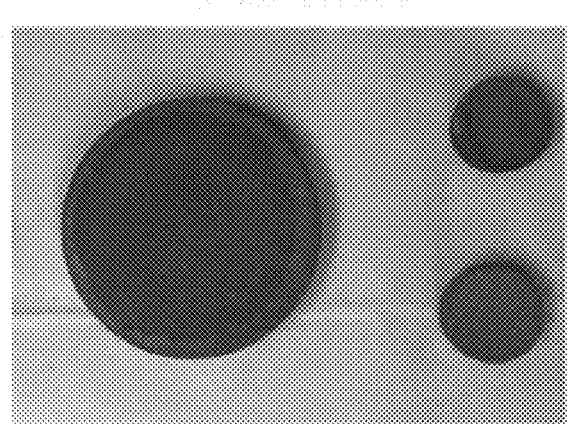
FIG. 5A FIG. 5B

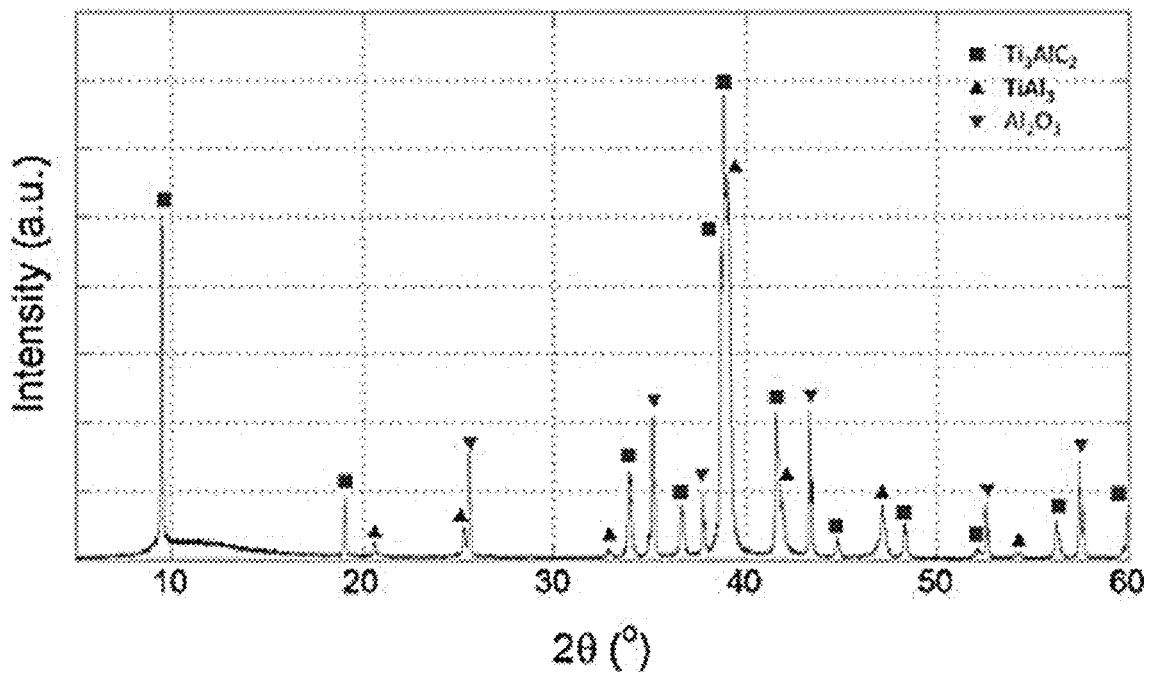
FIG. 6
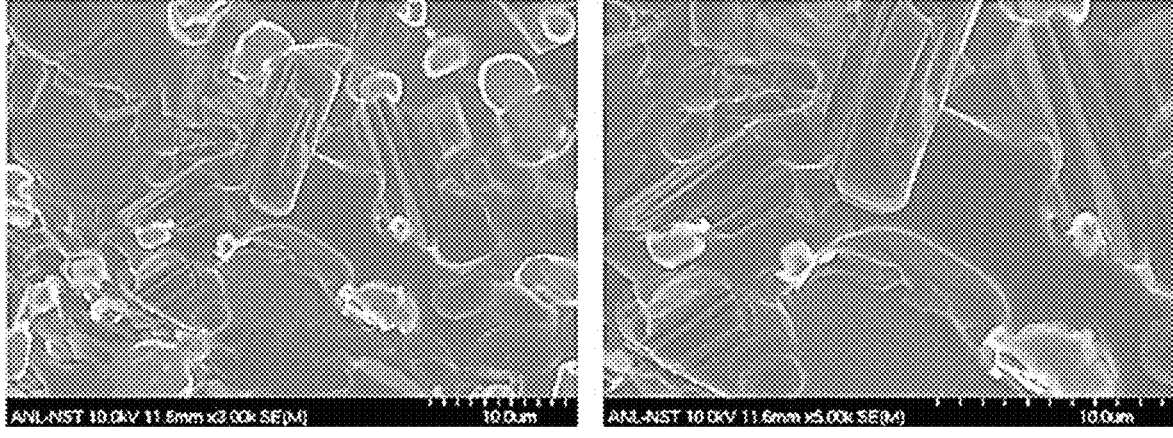
FIG. 7A                    FIG. 7B

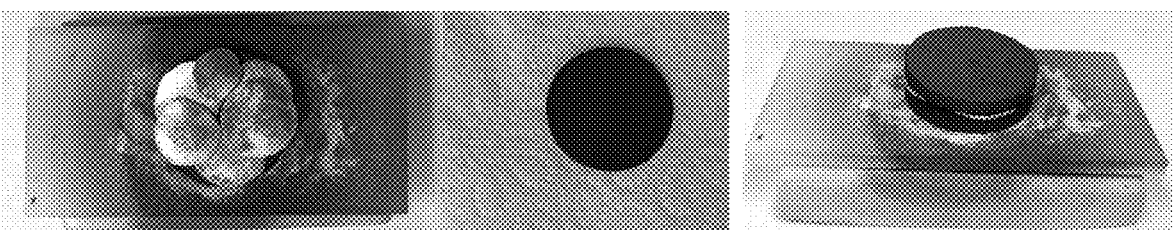
FIG. 13A          FIG. 13B          FIG. 13C
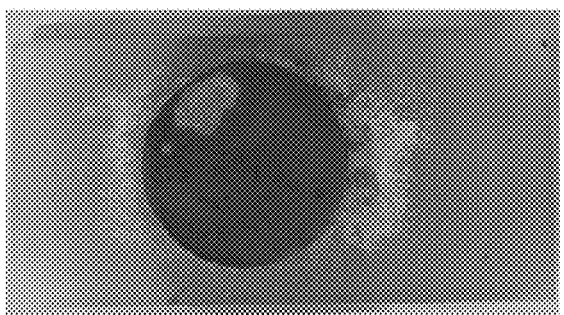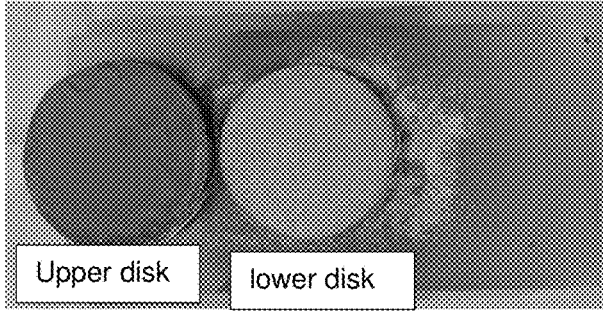
FIG. 14A          FIG. 14B
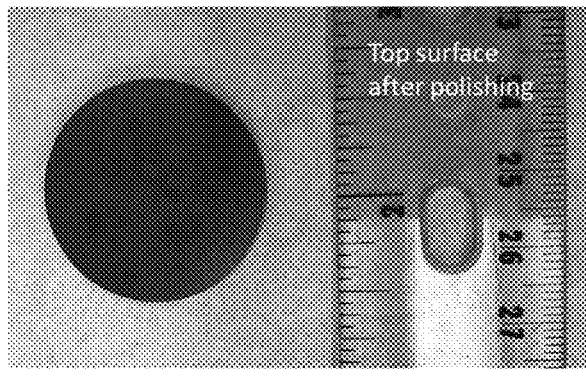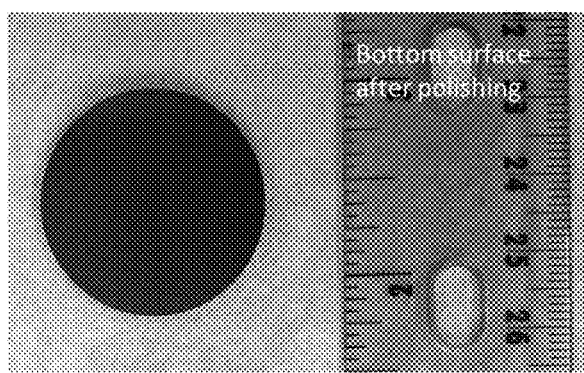
FIG. 15A                    FIG. 15B

Determination of Density by Archimedes Principle

Test date: 6/24/2022

Density of liquid: 0.7855 (g/cm³)

| Sample ID | Description | W1 (g) | W2 (g) | W3 (g) | W4 (g) | Density (g/cm³) | % of theoretical density | Open Porosity (%) | Porosity (%) |
|---|---|---|---|---|---|---|---|---|---|
| BM2206624B | Ti-Al-C disk Al infiltrated | 5.9718 | 5.9721 | 6.4513 | 1.7742 | 3.62 | 92.27 | 0.02% | 7.73% |

Average density (g/cc)= 3.62
Average porosity = 7.73%

Density of $Ti_3AlC_2$ (g/cc) =4.21     62.27%
Density of TiC (g/cc) =4.93     0.00%
Density of $Al_2O_3$ (g/cc) =3.95     15.62%
Density of $TiAl_3$ (g/cc) =3.37     13.44%
Density of Al (g/cc) =2.70     8.67%
Theoretical average density (g/cc) =3.93

Density of $Ti_2AlC$ (g/cc) =4.06

W1: Dry weight
W2: Wet weight
W3: Sample + Wire in liquid
W4: Wire only in liquid

FIG. 17

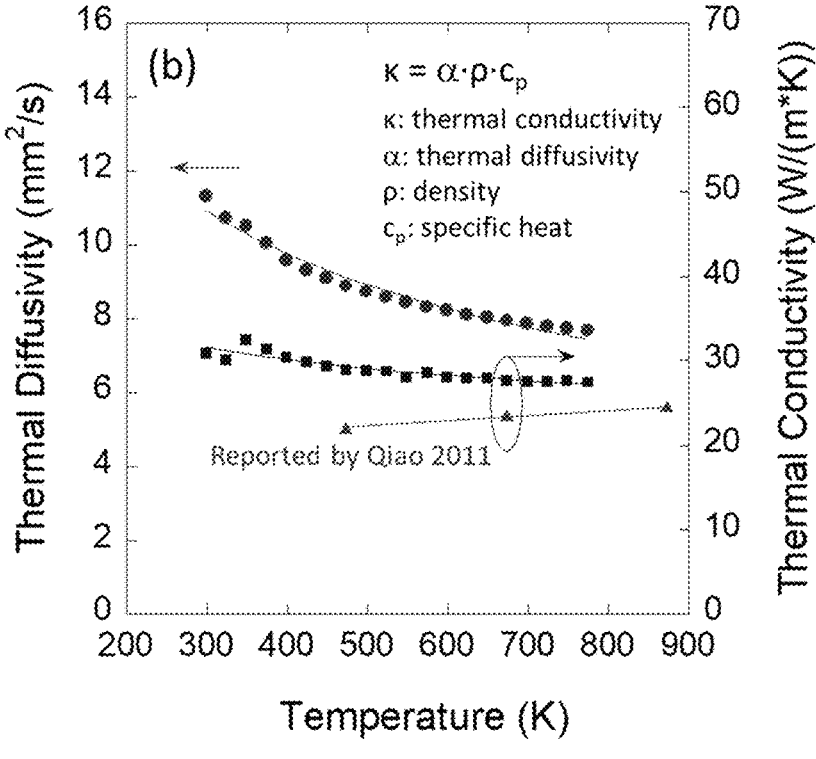
$$\kappa = \alpha \cdot \rho \cdot c_p$$
$\kappa$: thermal conductivity
$\alpha$: thermal diffusivity
$\rho$: density
$c_p$: specific heat
(b)
Reported by Qiao 2011
FIG. 18B
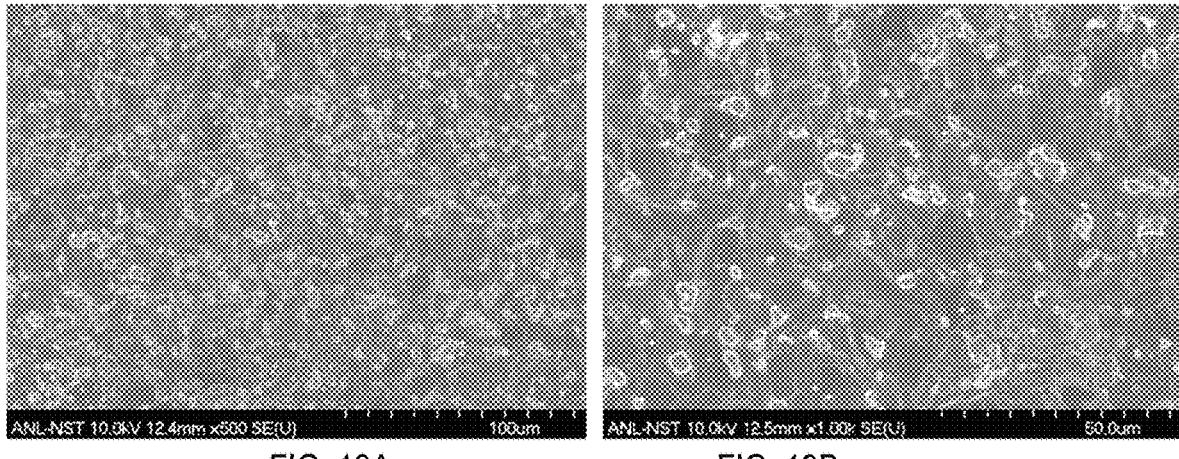
FIG. 19A                    FIG. 19B

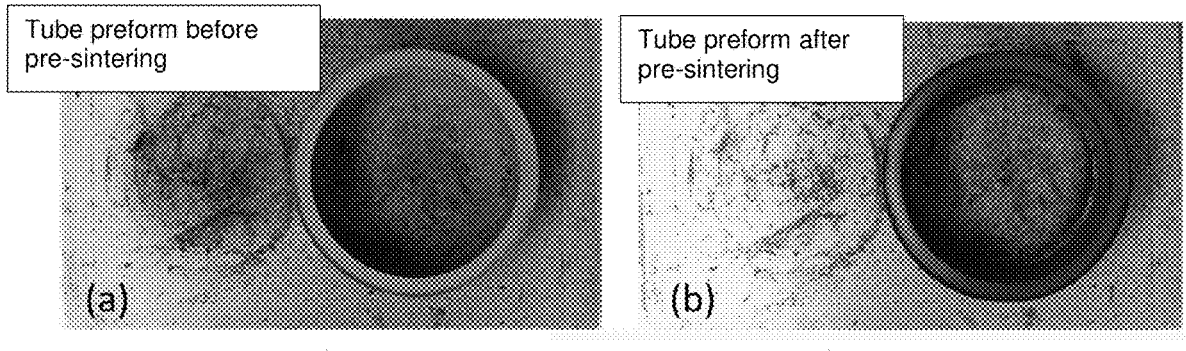
FIG. 21A                    FIG. 21B
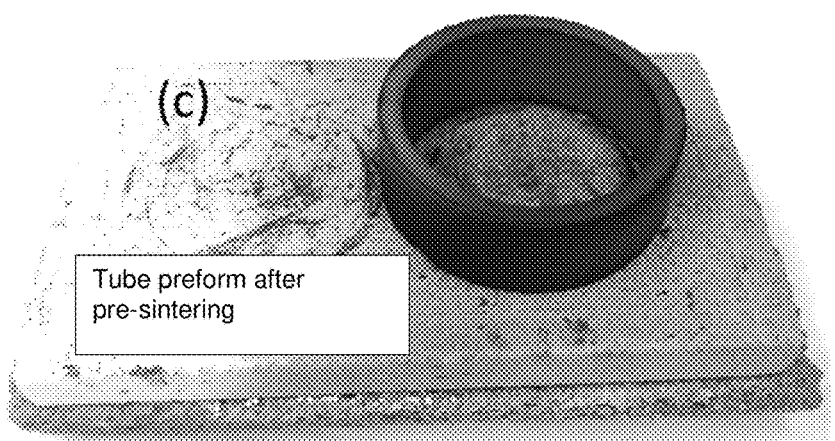
FIG. 21C
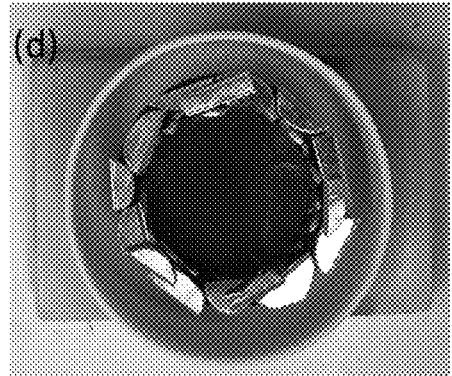
FIG. 21D MAX phase tube after 1400°C sintering Top view photo Brown color coated region Side photo Matrix without Brown coating Bottom photo Top end surface Lower end surface Side surface

METHOD FOR MAKING MAX PHASE COMPOSITES

CROSS-REFERENCE TO RELATED APPLICATION

The benefit of priority to U.S. Provisional Patent Application No. 63/481,591 filed Jan. 25, 2023, is hereby claimed and the disclosure is incorporated herein by reference in its entirety.

STATEMENT OF GOVERNMENT SUPPORT

This invention was made with government support under Contract No. DE-AC02-06CH11357 awarded by the United States Department of Energy to UChicago Argonne, LLC, operator of Argonne National Laboratory. The government has certain rights in the invention.

FIELD

The disclosure relates to MAX Phase ceramic composite materials and methods of making the same, and more particularly to methods of making MAX Phase ceramic composite articles by aluminum melt infiltration process and the resulting MAX Phase ceramic composite materials. Such MAX Phase ceramic composite can be particularly useful for high temperature applications due to their superior thermal and electrical conductivities, as well as outstanding high temperature mechanical properties.

BACKGROUND

MAX phase compounds are layered ceramic materials with the general formula $M_{n+1}AX_n$, where n=1 to 4, M is an early transition metal, A is an A-group element (mostly IIIA and IVA, or groups 13 and 14), and X is carbon and/or nitrogen. MAX phase materials exhibit combination of properties of metallic and ceramic materials. MAX phases typically present a hexagonal crystal structure, where layers of edge-shared $M_6X$-octahedra are interleaved with layers of "A" elements, which are located at the center of trigonal prisms. The "n" value indicates the number of "M" layers separating the A layers. The M-X bonds are exceptionally strong due to a mixed metallic-covalent nature, while the M-A bonds are relatively weak. This unique crystal structure is responsible for the characteristic layered structure and the combination of properties, bridging the gap between ceramics and metals.

In the 1960s, H. Nowotny and co-workers discovered a large family of ternary, layered carbides and nitrides, which they called the 'H' phases, now known as the '211' MAX phases (i.e., n=1), and several '312' MAX phases. Subsequent work extended to '312' phases (i.e., n=2) such as $Ti_3SiC_2$ and showed it to have unusual mechanical properties. In 1996, Barsoum and El-Raghy synthesized for the first time fully dense and phase pure $Ti_3SiC_2$ and revealed, by characterization, that it possesses a distinct combination of some of the best properties of metals and engineering ceramics. In 1999 they also synthesized $Ti_4AlN_3$ (i.e., a '413' MAX phase, n=3) and realized that they were dealing with a much larger family of solids that all behaved similarly. In 2020, $Mo_4VAlC_4$ (i.e., a '514' MAX phase, n=4) was published, the first major expansion of the definition of the family in over twenty years. Popular MAX Phase materials include $Ti_3SiC_2$, $Ti_3AlC_2$, and $Ti_2AlC$. MAX phase materials exhibit a unique combination of excellent conductivity (like metals) and superior high temperature mechanical strength (like ceramics). Conventional methods of making MAX phase parts and components typically requires high temperature (~1400°), high pressure, vacuum or inert atmosphere

SUMMARY

There exists a need of MAX phase composite materials and structures for a wide range of high temperature applications due to their desirable high temperature physical properties and superior mechanical strength, as well as a need of new methods of preparing the MAX phase composite materials and related articles.

The disclosure provides a method of preparing a M-A-X containing MAX Phase composite. The MAX Phase composite comprises a MAX Phase compound having formula $M_{n+1}AX_n$, wherein M is a transition metal selected from the group of Group 3, 4, 5, 6 and 7 transition metals and a combination thereof, wherein A is an A-group element selected from the group of IIA, IIIA, IVA, VA and VIA elements and a combination thereof, wherein X is C, N, or a combination thereof, and wherein n is 1, 2, 3, or 4. The method for preparing the MAX Phase composite comprises one or more of the following steps: preparing a precursor powder; forming a green body; pre-sintering the green body to form a pre-sintered preform; and forming the MAX phase composite through high temperature A-group element (such as aluminum) melt infiltration into the pre-sintered preform in an inert atmosphere.

One aspect of the disclosure provides a method of preparing a M-A-X containing MAX Phase composite, wherein M comprises one or more Group 3-7 transition metals, A is an A-group element, and X is C and/or N, the method comprising: forming a precursor powder into a discrete shape to thereby form a green body, wherein the precursor powder comprises a carbon source, an oxide of M, and one or both of a carbide and nitride of M; heating the green body at a pre-sintering temperature to partially reduce the oxide of M present in the green body to thereby form a pre-sintered preform; performing reactive infiltration by heating the pre-sintered preform in the presence of an infiltrating material comprising the A-group element to an infiltration temperature suitable for transforming the infiltrating material to a molten state, wherein the molten infiltrating material reacts with the pre-sintered preform to thereby form the MAX Phase composite, wherein: heating the green body at the pre-sintering temperature partially reduces the oxide of M present in the green body to an oxide of M capable of being wetted by the molten infiltrating material, and the MAX Phase composite comprises an oxide of A and at least one MAX Phase compound having formula $M_{n+1}AX_n$, wherein n is 1-4.

In accordance with methods of the disclosure, performing reactive infiltration can comprise arranging the infiltrating material between the pre-sintered preform and a sacrificial pre-sintered structure having the same composition as the pre-sintered preform. Performing reactive infiltration can be performed with the pre-sintered preform disposed on a support with an anti-stick powder disposed between the pre-sintered preform and the support, wherein the anti-stick powder is a material that is stable at the infiltrating temperature and non-reactive with the infiltrating material in the molten state.

Another aspect of the disclosure provides a method of preparing a M-A-X containing MAX Phase composite, wherein M comprises one or more Group 3-7 transition metals, A is an A-group element, and X is C or N, the method comprising: forming a precursor powder into a first discrete shape to thereby form a green body, wherein the precursor powder comprises a carbon source, an oxide of M, and one or both of a carbide and nitride of M; heating the green body at a pre-sintering temperature to partially reduce the oxide of M present in the green body to thereby form a pre-sintered preform; crushing the pre-sintered preform into a pre-sintered preform powder; admixing the pre-sintered preform powder with an infiltrating material powder and forming the admixture into a second discrete shape, wherein the infiltrating material powder comprises the A-group element; performing reactive infiltration by heating the second discrete shape to an infiltration temperature suitable for transforming the infiltrating material to a molten state, wherein the molten infiltrating material reacts with the pre-sintered preform powder in the second discrete shape to thereby form the MAX Phase composite, wherein: heating the green body at the pre-sintering temperature partially reduces the oxide of M present in the green body to an oxide of M capable of being wetted by the molten infiltrating material; the pre-sintered preform powder comprises oxide of M capable of being wetted by the molten infiltrating material, and one or both of the carbide and nitride of M; and the MAX Phase composite comprises an oxide of A and a MAX Phase compound having the formula $M_{n+1}AX_n$, where n is 1-4. The pre-sintered preform powder may further comprise carbon or the carbon source. The pre-sintered preform may be substantially free of carbon or the carbon source.

Reactive infiltration can be performed with the second discrete shape disposed on a support with an anti-stick powder disposed between the second discrete shape and the support, wherein the anti-stick powder is a material that is stable at the infiltrating temperature and non-reactive with the infiltrating material in the molten state.

Another aspect of the disclosure provides a method of preparing a Ti-Al-C containing MAX Phase composite, the method comprising: forming a precursor powder into a discrete shape to thereby form a green body, wherein the precursor powder comprises a carbon source, $TiO_2$, and TiC; heating the green body at a pre-sintering temperature and under conditions to partially reduce the $TiO_2$ present in the green body to $Ti_2O_3$, to thereby form a pre-sintered preform; and performing reactive infiltration by heating the pre-sintered preform in the presence of an infiltrating material formed of Al to an infiltration temperature suitable for transforming the infiltrating material to a molten state, wherein the molten infiltrating material reacts with the pre-sintered preform to thereby form the MAX Phase composite, wherein the MAX Phase composite comprises (i) a MAX Phase compound selected from one or more of $Ti_3AlC_2$ and $Ti_2AlC$ and (ii) $Al_2O_3$.

In accordance with methods of the disclosure, performing reactive infiltration can comprise arranging the infiltrating material between the pre-sintered preform and a sacrificial pre-sintered structure having the same composition as the pre-sintered preform. Performing reactive infiltration can be performed with the pre-sintered preform disposed on a support with a powder of $Al_2O_3$ disposed between the pre-sintered preform and the support.

Another aspect of the disclosure provides a method of preparing a Ti-Al-C containing MAX Phase composite, the method comprising: forming a precursor powder into a first discrete shape to thereby form a green body, wherein the precursor powder comprises a carbon source, $TiO_2$, and TiC; heating the green body at a pre-sintering temperature and under conditions to partially reduce the $TiO_2$ present in the green body to $Ti_2O_3$, to thereby form a pre-sintered preform; crushing the pre-sintered preform into a pre-sintered preform powder comprising $Ti_2O_3$ and TiC; admixing the pre-sintered preform powder with an aluminum powder and forming the admixture into a second discrete shape; and performing reactive infiltration by heating the second discrete shape to an infiltration temperature suitable for transforming the aluminum to a molten state, wherein the molten aluminum reacts with the pre-sintered preform powder in the second discrete shape to thereby form the MAX Phase composite, wherein the MAX Phase composite comprises (i) a MAX Phase compound selected from one or more of $Ti_3AlC_2$ and $Ti_2AlC$ and (ii) $Al_2O_3$. The pre-sintered preform powder may comprise carbon or the carbon source. In embodiments, the pre-sintered preform powder may be substantially free of carbon or the carbon source.

The MAX Phase composites of the disclosure have been observed to have beneficial properties, including, but not limited to, superior thermal and electrical conductivities, as well as outstanding high temperature mechanical properties. The MAX Phase composite can be useful for high temperature applications, such as many energy-saving and renewable energy related applications including thermal energy transportation, radiation protection for next generation nuclear facilities, and high strength components for use in high-temperature and other harsh environments.

A method of preparing M-A-X containing MAX Phase composite, wherein M comprises one or more Group 3-7 transition metals, A is an A-group element, and X is C or N, can include heating a precursor powder comprising a carbon source, an oxide of M, and one or both of a carbide and nitride of M to a pre-sintering temperature for pre-sintering the precursor powder to thereby form a pre-sintered precursor powder; admixing the pre-sintered precursor powder with a powder comprising the A-group element; forming the admixture into a discrete shape to thereby from a green body; heating the green body at a co-sintering temperature for melt infiltration of the A-group element to thereby form a co-sintered preform; and performing reactive infiltration by heating the co-sintered preform an infiltration temperature suitable for transforming an infiltrating material comprising the A-group element provided in the presence of the co-sintered preform and/or unreacted A-group element present in the co-sintered preform to a molten state, wherein the molten infiltrating material reacts with the co-sintered preform to thereby form the MAX Phase composite. Heating the precursor at the pre-sintering temperature partially reduces the oxide of M present in the precursor powder to an oxide of M capable of being wetted by the infiltrating materials, and the MAX Phase composite comprises an oxide of A and at least one MAX Phase compound having formula $M_{n+1}AX_n$, wherein n is 1-4.

BRIEF DESCRIPTION OF THE DRAWINGS

FIGS. 4A-4C are photographs of (A) disk preforms after pre-sintering, (B) sample setup before the A-group element melt infiltration, and (C) resulting samples after the A-group element melt infiltration respectively in accordance with the disclosure;

FIGS. 5A and 5B are photographs of (A) top surface and (B) bottom surface of as-prepared MAX phase disk samples respectively in accordance with the disclosure;

FIG. 6 is an X-ray diffraction pattern of a MAX phase $Ti_3AlC_2$ composite sample fabricated by Al melt infiltration at 1400° C. in argon flowing atmosphere in accordance with the disclosure;

FIGS. 7A and 7B are fracture surface SEM micrographs of a MAX phase $Ti_3AlC_2$ composite sample made by Al melt infiltration at 1400° C. in argon flowing atmosphere in accordance with the disclosure;

FIGS. 13A-13C are photographs of a sample stack before Al infiltration;

FIGS. 14A-14B are photographs of a sample stack after Al infiltration at 1400° C. for 90 minutes;

FIGS. 15A-15B are images of a crack-free Al infiltration sample after surface polishing;

FIG. 17 is a table showing the bulk density of crack-free Al infiltrated samples determined by Archimedes principle;

FIGS. 18A-18B are graphs showing (A) specific heat capacity, (B) thermal diffusivity and thermal conductivity of a crack-free MAX phase composite sample prepared by Al infiltration method, respectively;

FIGS. 19A-19D are fracture surface SEM micrographs of a crack-free 1400° C. Al infiltrated MAX phase $Ti_3AlC_2$ composite disk sample at different magnifications;

FIGS. 21A-21D are photographs of (A) a tube preform made by pressing before pre-sintering at 1400° C. in Ar flowing, (B, C) the tube preform after pre-sintering, and (D) an arrangement of aluminum pieces and tube preform before infiltration;

DETAILED DESCRIPTION

Figure 1A:
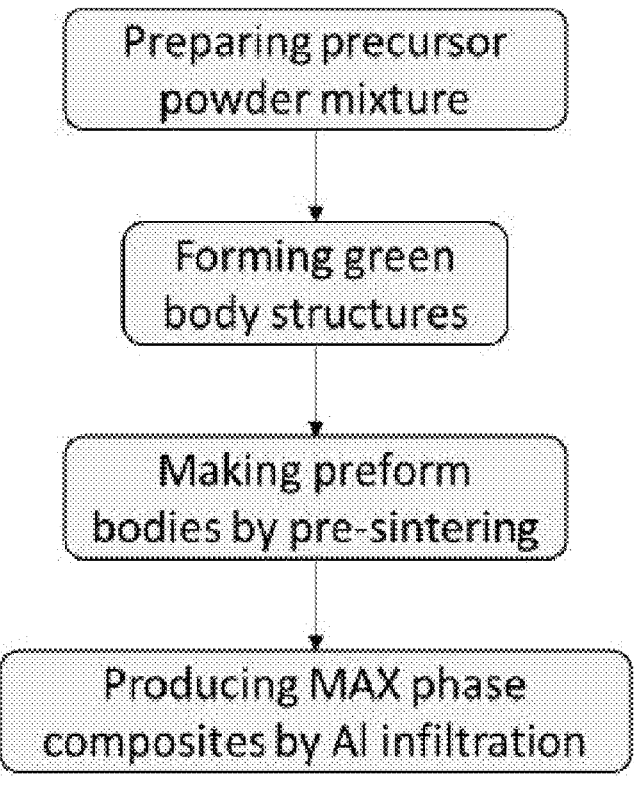
FIG. 1A is a flow chart of making a MAX phase composite by an A-group element melt infiltration in a process in accordance with the disclosure.
Figure 1B:
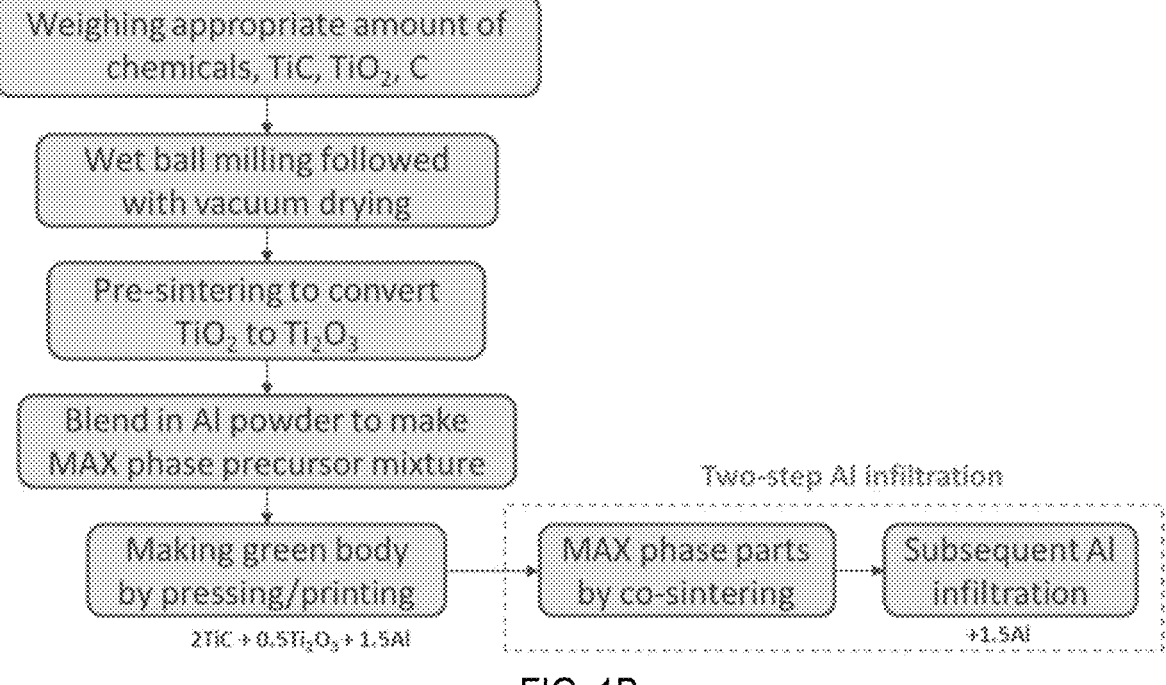
FIG. 1B is a flow chart of making a MAX phase composite by an A-group element melt infiltration in a FIG. 2 is a schematic illustration of a die set for making tubular green body structures in a process in accordance with the disclosure.

Methods of the disclosure can be used to form M-A-X containing MAX phase composite materials, where M comprises one or more Group 3-7 transition metals, A is an A-group element, and X is C and/or N. The MAX Phase composite materials formed in accordance with the methods of the disclosure can include at least one MAX Phase compound having the formula $M_{n+1}AX_n$ and an oxide of A, wherein n is 1-4. FIG. 1A illustrates a general flow chart of a process in accordance with the disclosure, using a single stage infiltration process. FIG. 1B illustrates another general flow chart of a process in accordance with the disclosure, using a two-stage infiltration process.

Advantageously, the methods of the disclosure can allow for the formation of MAX Phase composite materials in discrete and if desired, complex shapes. The methods of the disclosure can advantageously be used with various shape forming methods, such as additive manufacturing methods, to produce MAX Phase composite articles in shapes unachievable by conventional MAX Phase production methods. Conventionally, processes of making MAX Phase materials were limited in their ability to form complex shaped structures, limiting the feasibility of using MAX Phase materials in various high temperature applications. The ability of the methods of the disclosure to form MAX Phase composite articles in arbitrary and complex shapes opens the possibility of forming various parts need in high temperature applications out of MAX phase composites.

A method of forming a MAX phase composite material in accordance with the disclosure can include forming a precursor powder into a discrete shape to thereby form a green body. The precursor powder comprises a carbon source, an oxide of M, and one or both of a carbide and nitride of M. The method further includes heating the green body at a pre-sintering temperature to partially reduce the oxide of M present in the green body to thereby form a pre-sintered preform. The method then includes performing reactive infiltration by heating the pre-sintered preform in the presence of an infiltrating material comprising the A-group element to an infiltration temperature suitable for transforming the infiltrating material to a molten state, wherein the molten infiltrating materials reacts with the pre-sintered preform to thereby form the MAX Phase composite A method of preparing a M-A-X containing MAX Phase composite in accordance with the disclosure can include heating a precursor powder comprising a carbon source, an oxide of M, and one or both of a carbide and nitride of M to a pre-sintering temperature for pre-sintering the precursor powder to thereby form a pre-sintered precursor powder. Heating at the pre-sintering temperature partially reduces the oxide of M present in the precursor powder to an oxide of M capable of being wetted by the infiltrating materials. The pre-sintered precursor powder can then be admixed with a powder comprising the A-group element. The resulting admixture can be formed into a discrete shape to form a green body. The green body can then be heated at a co-sintering temperature for melt infiltration of the A-group element to thereby form a co-sintered preform. Reactive infiltration can then be performed by heating the co-sintered preform performing reactive infiltration by heating the co-sintered preform to an infiltration temperature suitable for transforming an infiltrating material comprising the A-group element provided in the presence of the co-sintered preform and/or unreacted A-group element present in the co-sintered preform to a molten state, wherein the molten infiltrating material reacts with the co-sintered preform to thereby form the MAX Phase composite. The molten infiltrating material reacts with the co-sintered preform to thereby form the MAX Phase composite.

The precursor powder can include a mixture of the carbon source, an oxide of M, and one or both of a carbide and nitride of M. The precursor powder can include a molar ratio of the carbide and/or nitride of M:the oxide of M:carbon source in a range of about 10:0.5:0.1 to about 1:6:3. For example, in one example, the precursor powder can include powders of $TiC:TiO_2:C$ in a molar ratio of 4:2:1. The carbide and/or nitride of M may be present in a range of 20-95 wt. % by weight of the precursor powder. The oxide of M may be present in a range of about 5-60 wt. % by weight of the precursor powder. The carbon source may be present in a range of about 1-30 wt. % by weight of the precursor powder.

The Group 3-7 transition metal M can be any one or more of tantalum (Ta), hafnium $(H_f)$, titanium (Ti), vanadium (V), chromium (Cr), niobium (Nb), molybdenum (Mo), zirconium (Zr), scandium (Sc), yttrium (Y), lutetium (Lu), tungsten (W), manganese (Mn), or iron (Fe). In embodiments, M may be one or more of tantalum (Ta), hafnium $(H_f)$, titanium (Ti), vanadium (V), chromium (Cr), niobium (Nb), molybdenum (Mo), and zirconium (Zr). Selection of the transition metal M in the precursor powder provides selection of the transition metal M in the MAX phase compound produced by the method. For example, the precursor powder can include titanium as the transition metal to thereby provide a MAX Phase compound where M is titanium (Ti).

The A-group element can be any one or more of aluminum (Al), tin (Sn), silicon (Si), phosphorous (P), sulfur(S), gallium (Ga), germanium (Ge), arsenic (As), cadmium (Cd), indium (In), thallium (TI), lead (Pb), palladium (Pd), iridium (Ir), gold (Au), bismuth (Bi), copper (Cu), or zinc (Zn). In embodiments, A may be one or more of aluminum (Al), tin (Sn), silicon (Si), phosphorous (P), sulfur(S), gallium (Ga), germanium (Ge), arsenic (As), cadmium (Cd), indium (In), thallium (TI), and lead (Pb). In embodiments, A is aluminum.

The precursor powder can have an average particle size in a range of about 0.1-50 μm, or about 1-10 μm.

The carbide and/or nitride of M can be a powder having an average particle size of about 0.01-50 μm, or about 1-10 μm, or about 1-5 μm.

The oxide of the M can be a powder having an average particle size of about 0.01-50 μm, about 1-10 μm, or about 1-5 μm.

The carbon source can be any source of carbon. For example, the carbon source can be graphite, dextrin, amorphous carbon, carbon black, carbon fibers, carbon nanotubes, carbohydrates, and gas phase, liquid phase or solid phase hydrocarbons. When provided as a powder, the carbon source can have an average particle size of about 0.01-50 μm, or about 0.1-20 μm, or about 1-10 μm, or about 7-10 μm.

The precursor powder can be formed, for example, by milling the powders together with a solvent to form a slurry. The solvent can be an organic solvent, such as methanol, ethanol, isopropyl alcohol, or other alcohol solvent. The slurry can then be dried to form a dried powder. The drying can be vacuum drying at room temperature for about 1-50 hours, 5-24 hours, or 8-16 hours, or about 12 hours. The dried powder can be further dry-milled for about 1-20 hours, or about 1-10 hours, or about 2-6 hours, or about 4 hours to form the precursor powder. A weight ratio of the total amount of powder (including the carbide and/or nitride of M, the oxide of M and the carbon source) to the solvent can be in a range of about 10:1 to about 1:10, or about 3:1 to about 1:5, or about 3:2. The milling of the slurry can be performed by ball-milling using grinding balls, for example. After milling the grinding balls can be separated from the powder using a sieve. A weight ratio of the total amount powder to the grinding balls can be in a range of about 5:1 to about 1:10, about 3:1 to about 1:10, about 5:1 to about 3:1, about 1:1 to about 1:5, or about 1:3.

Methods of the disclosure can include pre-sintering the precursor powder before forming it into a green body. The pre-sintering of the powder can be performed using the conditions described below. After pre-sintering, the powder is admixed with a powder comprising the A-group element. For example, the powder of the A-group element can be added in an amount sufficient to replace the M of the oxide of M to from the oxide of the A-group element, as well as provide remaining Al unreacted for later forming the MAX phase. The amount of A-group element added to the pre-sintered powder can be less than a total amount of A-group element needed to form a desired amount of MAX phase in the MAX phase composite. In such processes in which an amount of A-group element is added to the pre-sintered powder in an amount less than needed to form the desired amount of MAX phase, additional A-group element can be added as an infiltrating material during a subsequent infiltration of the co-sintered green body. Alternatively, an amount of A-group element needed to form a desired amount of MAX phase can be added to the pre-sintered powder, where less than all of the A-group element present is utilized in MAX phase formation during co-sintering of the green body and the unreacted A-group element material present in the co-sintered body is later infiltrated into the co-sintered preform during the reactive infiltration process.

For example, an amount of A-group element added to the pre-sintered precursor powder can be about ⅓ to about 2 parts per total parts of carbide and/or nitride of M present in the pre-sintered precursor powder. For example, the A-group element can be, per total parts of carbide and/or nitride of M present in the pre-sintered precursor powder, ⅓ to 1 parts, 1 to 2 parts, or ⅔ to 1.5 parts. Reactive infiltration can be performed with 0 to 8/3 parts additional A-group element per total parts of carbide and/or nitride of M present in the pre-sintered precursor powder being added during reactive infiltration. For example, the reactive infiltration can be performed with additional A-group element, per total parts of carbide and/or nitride of M present in the pre-sintered precursor powder, of about ⅓ to 8/3 parts, 1 to 2 pars, 0 to 1 parts, or 0 to 1.5 parts. 0 parts additional A-group element added during reactive infiltration represents a process in which no additional A-group element is presented during reactive infiltration and only unreacted A-group element present in the co-sintered preform is heated to a molten state and reacted with the co-sintered preform to thereby form the MAX Phase composite.

For example, the pre-sintered precursor powder can be $2TiC+0.5Ti_2O_3$. With such a powder, the addition of 1.5 parts of Al as the A-group element results in an amount of 21 wt % based on the total weight of the $2TiC+0.5$ $Ti_2O_3$ pre-sintered precursor powder.

For example, a ratio of carbide and/or nitride of M:the oxide of M to the A-group element can be about 1:1:3 to about 1:5:6. For example, Al powder can be added as the powder comprising the A-group element to a pre-sintered mixture of $2TiC+0.5Ti_2O_3$ in an amount of 3Al, or 42 wt % Al based on the total weight of the precursor powder $(2TiC+0.5Ti_2O_3)$.

Figure 2:
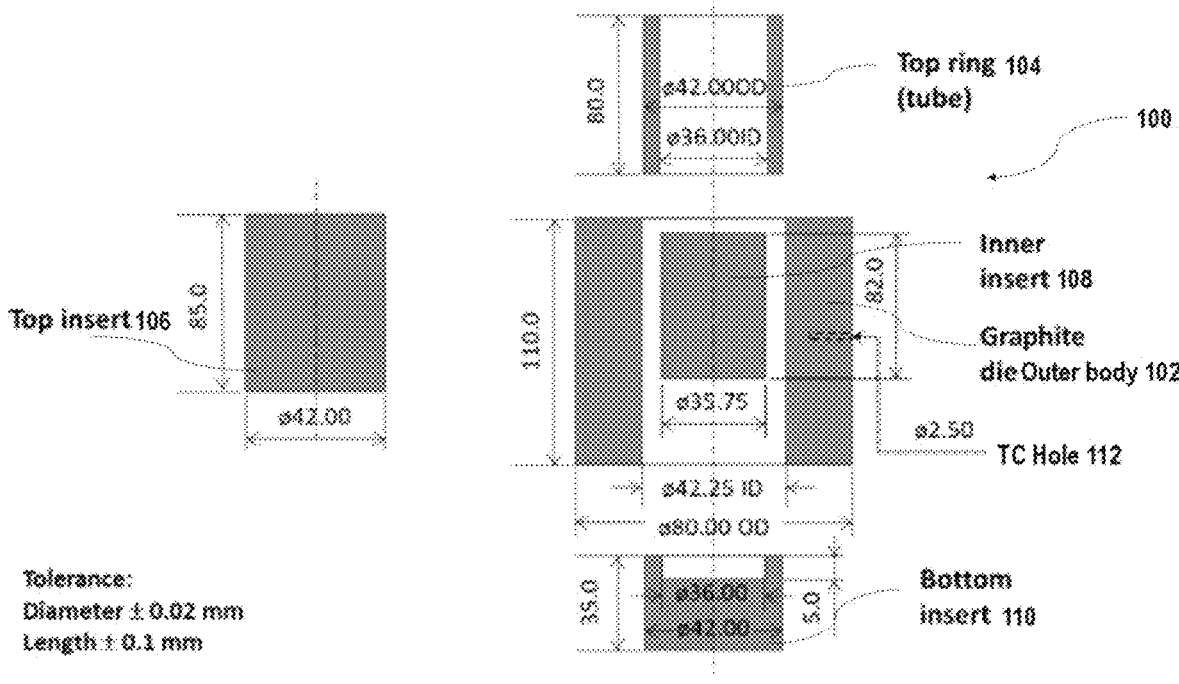

The green body can be shaped into any desired shaped using any known methods. For example, the precursor powder or pre-sintered precursor powder admixture with the A-group element can be shaped into the discrete shape by pressing the powder into the desired shape. Reference herein will be made to forming the green body from a precursor powder; however, it should be understood that such disclosure for forming the green body from the precursor powder also applies to forming the green body from the pre-sintered precursor powder admixed with the A-group element. For example, the powder can be pressed into a mold to form the desired shape. For example, loading pressures of about 0.1 to about 10 MPa can be used to press the powder into the die to form the desired shape. FIG. 2 illustrates a tube-shaped mold used for forming tube-shaped green bodies in the examples. Additive manufacturing methods, such as 3D binder jet printing can be used to form complex shapes of the precursor powder. For example, a precursor powder can utilize dextrin $(C_6H_{10}O_5)_n$(n=10-200) as the carbon source in a precursor powder. A 3D printing using a water-based jet solution can be used to form the discrete shape. Dextrin in the precursor powder dissolves in the water solution and powder particles become bound in the dextrin solution during printing, whereas neighboring powder remains unbound. The printed green bodies can be dried and then during pre-sintering the dextrin is carbonized. Other printing methods can also be used, for example, using binders or other additives in the printing process to form the precursor powder into the discrete shape. In such processes a further heating for burning off of the binder can be used or the binder can be burned off during the pre-sintering process. Extrusion methods can also be used to form complex shapes of the green body. A binder or a solvent may be used during the extrusion process.

The green body can be formed into the final shape desired for the article. This can advantageously allow the method of the disclosure to produce a MAX Phase composite in the final desired shape without the need for post-synthesis machining or cutting to form the desired shape. The as-formed composite articles can be ground or polished, as needed.

In method of the disclosure using a precursor powder without pre-sintering of the powder, once the green body is formed into the desired shape, a pre-sintering process is performed by heating the green body to a pre-sintering temperature. In methods of the disclosure including pre-sintering the precursor powder before forming the green body, the precursor powder is heated to the pre-sintering temperature. In each of the methods of the disclosure, regardless of when pre-sintering is performed, the pre-sintering temperature is selected such that during pre-sintering the oxide of M present in the green body is partially reduced to thereby form the pre-sintered preform. The partial reduction of the oxide of M results from heating the oxide of M in the presence of carbon and results in the formation of an oxide of M present in the pre-sintered preform that is capable of being wetted by the infiltrating material. For example, in a system containing $TiO_2$ in the precursor powder and thus in the green body, it was found that infiltration could not be accomplished with Al because the Al did not wet the $TiO_2$. The pre-sintering process partially reduces the $TiO_2$ to $Ti_2O_3$, which can readily react and be infiltrated with Al during the subsequent infiltration step. The pre-sintering process can be performed in an inert atmosphere, for example, flowing an inert gas such as argon (Ar).

The pre-sintering temperature can be in a range of about 500° C. to about 2500° C., about 900° C. to about 1500° C., about 800° C. to about 2000° C., about 100° C. to about 1400° C. Other suitable temperatures include, for example, 500, 600, 700, 800, 900, 1000, 1100, 1200, 1300, 1400, 1500, 1600, 1700, 1800, 1900, 2000, 2100, 2200, 2300, 2400, or 2500° C., or any value therebetween or any ranges defined therebefore. The pre-sintering can be performed for about 1 minute to about 5 hours, about 0.1 hour to about 2 hours, about 0.5 hour to about 1.5 hours, or about 3 hours to about 5 hours. Other suitable times can include about 1 min, 5 min, 10 min, 15 min, 20 min, 25 min, 30 min 35 min, 40 min, 45 min, 50 min, 55 min, 1 hr, 1.5 hr, 2 hr, 2.5 hr, 3 hr, 3.5 hr, 4 hr, 4.5 hr, or 5 hr, or any values therebetween or any ranges defined therefrom.

The pre-sintered preform may have pores having an average pore size in a range of about 0.1 to about 10 μm, or about 1 μm, and may have a porosity in a range of about 10-90%, or about 25-65%. The pre-sintering process can be conducted following a heating profile shown in FIG. 3A or 3B.

In methods in which the green body is formed from the admixture of the pre-sintered precursor powder and the A-group element powder, the green body is heated to a co-sintering temperature for melt infiltration of the A-group element to thereby form a co-sintered preform. For example, the co-sintering temperature can be in a range of about 1300° C. to about 1500° C. Other co-sintering temperatures can include, for example, about 500-2500° C., or about 800-2000° C., about 900-1500° C., about 900-1800° C., In methods in which a pre-sintered preform is formed from pre-sintering a green body formed from the precursor powder, reactive infiltration is then performed on the pre-sintered preform by heating the pre-sintered preform in the presence of an infiltrating material containing or being formed of the A-group element to an infiltration temperature suitable for transforming the infiltrating material to a molten state. When in the molten state, the infiltrating material reacts with the pre-sintered preform to thereby form the MAX Phase composite.

In methods in which co-sintering is performed, the reactive infiltration is performed on the co-sintered preform by heating the co-sintered to an infiltration temperature suitable for transforming the infiltrating material provided in the presence of the co-sintered preform and/or unreacted A-group element within the co-sintered preform to a molten state. When in the molten state, the infiltrating material and/or unreacted A-group element reacts with the co-sintered preform to thereby form the MAX Phase.

A weight ratio of the infiltrating material to the pre-sintered preform can be in a range of about 1:5 to about 1.2:1, about 1:4 to about 1:1, about 2:5 to about 4:5, or about 0.26:1 to about 0.82:1, or about 2:5 to about 4:5.

The infiltration temperature can be in a range of about 500-2500° C., or about 800-2000° C., about 900-1500° C., about 900-1800° C., or about 1300-1500° C. The reactive infiltration can be performed for about 0.1-20 hours, or about 0.1-10 hours, or about 0.5-5 hours, or about 1-3 hours, or about 1.5 hours.

The reactive infiltration process can be performed in an inert atmosphere, for example, flowing an inert gas such as argon (Ar).

A weight ratio of the infiltrating material to the pre-sintered preform is in a range of about 1:10 to about 10:1, or about 1:5 to about 6:5, or about 1:4 to about 1:1, or about 0.25 to about 0.82. The reactive infiltration process can be controlled to have a desired infiltration or diffusion rate, such as infiltrating about 10 mm in thickness of the pre-sintered preform sample in about 1-60 minutes.

The infiltrating material can be placed in the presence of the pre-sintered or co-sintered preform in a variety of ways. The infiltrating material is placed in such proximity that upon melting, the A-group element can diffuse or penetrate into the pre-sintered or co-sintered preform for reaction to form the MAX Phase composite. For example, the infiltrating material can be placed in direct contact with one or more surfaces of the pre-sintered or co-sintered preform. For example, the infiltrating material can be placed on top of the pre-sintered or co-sintered preform, in such arrangement, gravity can assist with directing the molten A-group element to the pre-sintered or co-sintered preform. For example, the infiltrating material can surround a surface of the pre-sintered or co-sintered preform. For example, the infiltrating material can surround a perimeter of the pre-sintered or co-sintered preform. For example, the infiltrating material can cover one or more surfaces of the pre-sintered or co-sintered preform. For example, the pre-sintered preform or co-sintered can be dip-coated with the infiltrating material. A collar or shell of infiltrating material can be formed around the pre-sintered or co-sintered preform as another example. In still further example, one or more pieces of infiltrating material can be placed on a surface of the pre-sintered or co-sintered preform.

A sacrificial pre-sintered preform can be used during infiltration to aid in prevention of cracks forming during infiltration of a pre-sintered preform. It was observed that the inclusion of a sacrificial pre-sintered preform during the infiltration process can absorb excess infiltrating material that may be present and aid in providing a more homogenous distribution of the infiltrating material. For example, as shown in FIG. 4B, infiltrating material can be placed between a sacrificial pre-sintered preform and the pre-sintered preform to be infiltrated. The sacrificial pre-sintered preform can be formed of the same precursor powder and with the same pre-sintering process as the pre-sintered preform. For example, during infiltration, the sacrificial pre-sintered preform can be placed on top of the pre-sintered preform, with the infiltrating material sandwiched therebetween. The sacrificial pre-sintered preform can be made of materials different from the pre-sintered preform, such as any material that can react with or be wet by the molten A.

Referring to FIG. 21D, the sacrificial pre-sintered preform can also be placed within the pre-sintered preform for preform shapes that have openings or apertures, such as tube shapes. In such arrangements, the infiltrating material can be arranged in a gap between the sacrificial pre-sintered preform and the pre-sintered preform. FIG. 21D shows an example of a tube-shaped pre-sintered preform and a disk-shaped sacrificial pre-sintered preform of a smaller diameter placed inside the tube, with the gap between the two being filled by the infiltrating material.

Figure 3A:
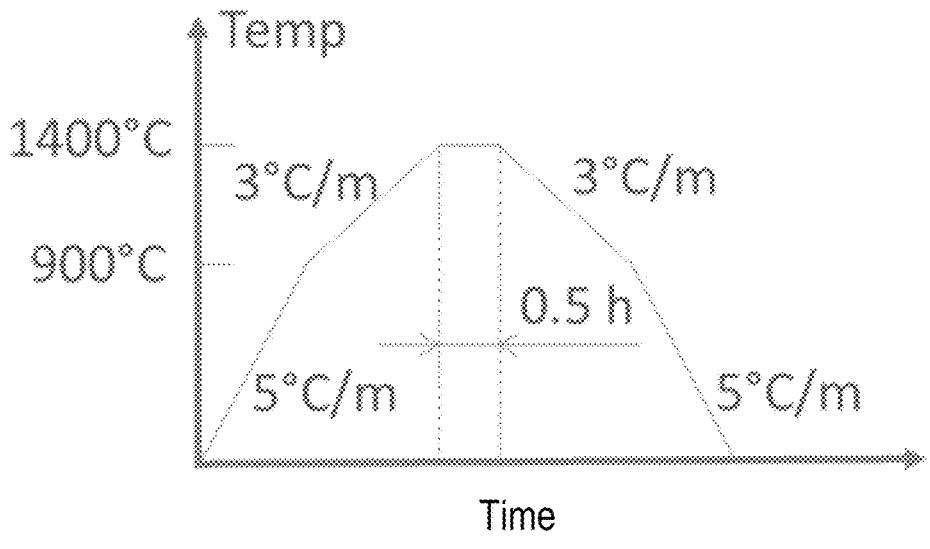
FIGS. 3A and 3B are graphs showing the heating profiles used for (A) the pre-sintering process and (B) the A-group element melt infiltration process, in accordance with the disclosure.
Figure 3B:
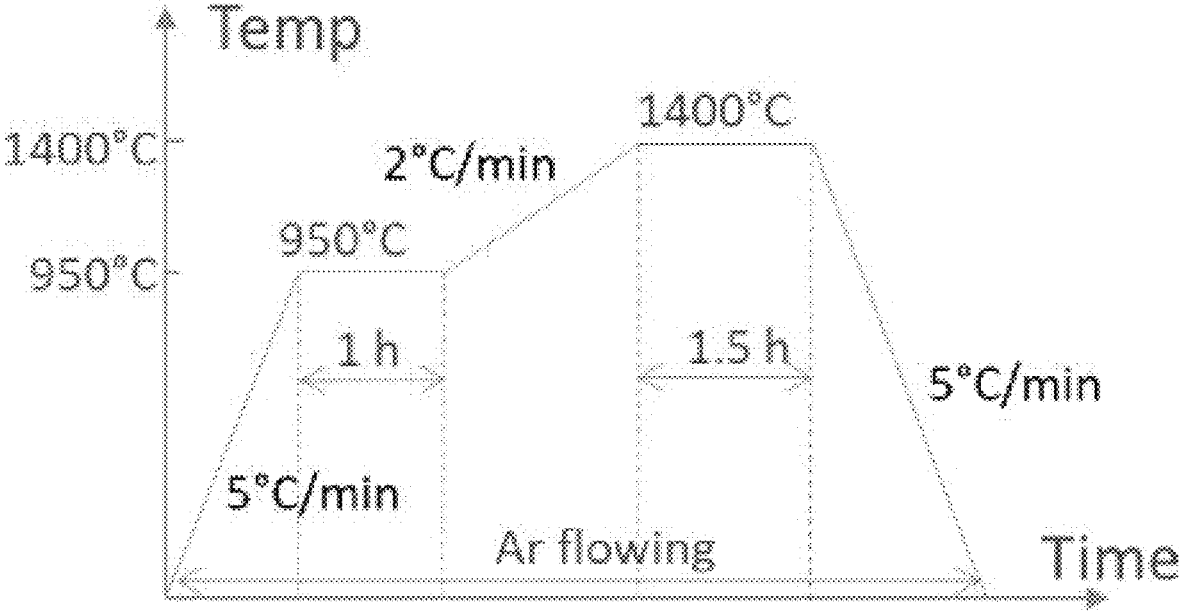
Figures 8A, 8B, 8C:
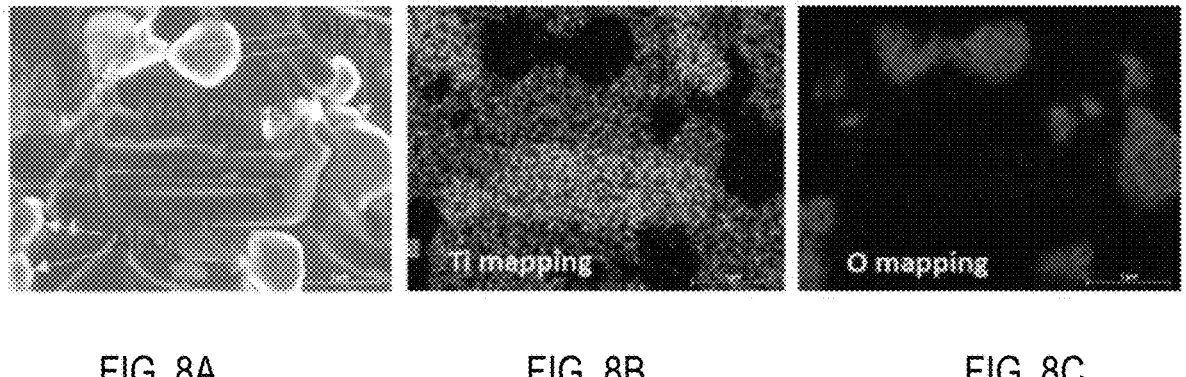
FIGS. 8A to 8F are fracture surface SEM/EDX mapping of a MAX phase $Ti_3AlC_2$ composite sample made in accordance with the disclosure by Al melt infiltration at 1400° C. in argon flowing atmosphere where (A) is SEM micrographs of a MAX phase $Ti_3AlC_2$ composite sample showing $Ti_3AlC_2$ and $Al_2O_3$ grains; (B) is Ti mapping; (C) is O mapping; (D) is C mapping; (E) is Al mapping; and (F) is hyper image respectively.
Figures 8D, 8E, 8F:
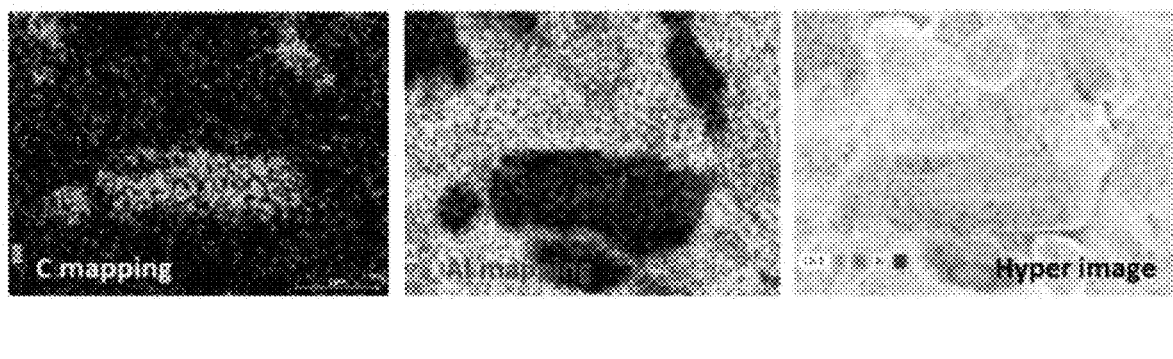

The heating performed for the pre-sintering process, the co-sintering process, and reactive infiltration process can be done in any suitable furnace or other heating apparatus. Various heating profiles can be used. For example, a heating profile such as shown in FIG. 3B can be used during reactive infiltration.

Typically, the materials to be heated are placed on a support before being placed into the furnace. Supports are commonly formed of zirconia or alumina. Any known support can be used. It was observed that sticking of the pre-sintered or the co-sintered preform can occur during the reactive infiltration process. To avoid such sticking, a non-reactive anti-sticking powder can be placed on the support between the support surface and the pre-sintered or co-sintered preform. In embodiments, when the infiltrating material is sandwiched between the pre-sintered preform and the sacrificial pre-sintered preform, the anti-sticking powder can also be placed between the infiltrating material and the sacrificial pre-sintered preform to prevent the sticking of the sacrificial pre-sintered preform to the resulting MAX Phase composite.

For example, the anti-sticking powder can be an oxide of A. The powder can be, for example, $Al_2O_3$ powder. The anti-sticking powder can have an average particle size of about 0.1 µm to about 500 µm, about 0.1 µm to 200 µm, or about 1 µm to 100 µm, about 10 µm to 600 µm, about 20 µm to about 60 µm, or about 40 µm.

Methods of the disclosure can alternatively include an infiltrating process in which the infiltrating material is premixed as a powder with the precursors needed to form the MAX Phase composite. A precursor powder, as described above, can be formed into a first discrete shape to form a green body which can be pre-sintered as described above and using any of the conditions described herein. As described above, the pre-sintering process results in the oxide of M being partially reduced. The resulting pre-sintered preform is crushed, ground, or otherwise broken down into a powder, referred to herein as a pre-sintered preform powder. The pre-sintered preform powder includes the partially reduced oxide of M and the carbide and/or nitride of M (depending on what was present in the original precursor powder). The pre-sintered preform powder can optionally include carbon or the carbon source. The pre-sintered preform powder is mixed with an infiltrating material powder and the resulting mixture is formed into a second discrete shape. The infiltrating material powder includes the A-group element. Reactive infiltration is then performed by heating the second discrete shape to the infiltration temperature to transform the infiltrating material to a molten state.

When in the molten state, the infiltrating material reacts with the pre-sintered preform powder to thereby form the MAX phase composite.

Any of the preform forming methods described above can be used in forming the first and/or second discrete shapes. The second discrete shape can be formed into the final shape desired for the article. This can advantageously allow the method of the disclosure to produce a MAX Phase composite in the final desired shape without the need for post-synthesis machining or cutting to form the desired shape. The as-formed composite articles can be ground or polished, as needed.

The MAX Phase compound in the MAX Phase Composite can have the formula $M_{n+1}AX_n$. Examples of MAX Phase compounds which can be produced in the composites of the disclosure can include 514 phases, for example, $Mo_4VAlC_4$; 413 phases, for example, $Ti_4AlN_3$, $V_4AlC_3$, $Ti_4GaC_3$, $Ti_4SiC_3$, $Ti_4GeC_3$, $Nb_4AlC_3$, $Ta_4AlC_3$, and $(Mo, V)_4AlC_3$; 312 phases, for example, $Ti_3AlC_2$, $Ti_3GaC_2$, $TiglnC_2$, $V_3AlC_2$, $TisSiC_2$, $TisGeC_2$, $Ti_3SnC_2$, $TasAlC_2$, $TisZnC_2$, and $Zr_3AlC_2$; and 211 phases, for example, $Ti_2CdC$, $Sc_2InC$, $SC_2SnC$, $Ti_2AlC$, $Ti_2GaC$, $TizlnC$, $Ti_2TIC$, $V_2AlC$, $V_2GaC$, $Cr_2GaC$, $Ti_2AlN$, $Ti_2GaN$, $Ti_2InN$, $V_2GaN$, $Cr_2GaN$, $Ti_2GeC$, $Ti_2SnC$, $Ti_2PbC$, $V_2GeC$, $Cr_2AlC$, $Cr_2GeC$, $V_2PC$, $V_2AsC$, $Ti_2SC$, $Zr_2InC$, $Zr_2TIC$, $Nb_2AlC$, $Nb_2GaC$, $Nb_2InC$, $MO_2GaC$, $Zr_2InN$, $Zr_2TIN$, $Zr_2SnC$, $Zr_2PbC$, $Nb_2SnC$, $Nb_2PC$, $Nb_2AsC$, $Zr_2SC$, $Nb_2SC$, $Hf_2InC$, $Hf_2TIC$, $Ta_2AlC$, $Ta_2GaC$, $Hf_2SnC$, $Hf_2PbC$, $Hf_2SnN$, $Hf_2SC$, $Zr_2AlC$, $Ti_2ZnC$, $Ti_2ZnN$, $V_2ZnC$, $Nb_2CuC$, $Mn_2GaC$, $Mo_2AuC$, and $Ti_2AuN$.

In accordance with the disclosure, the M can be two transitional metals, for example. Non-limiting examples of the compounds having two transitional metals in the formula $M_{n+1}AX_n$ can include, for example, $Mo_4VAlC_4$ (514 phase), $(Cr_{0.5}V_{0.5})_3AlC_2$, $(Mo_{2/3}Ti_{1/3})_3AlC_2$, $(Ti_{0.5}V_{0.5})_3AlC_2$, $(Nb_{0.5}V_{0.5})_2AlC$, or $(Ti_{1-x}Zr_x)_2AlC$ for $0<x<1$.

For example, the element A can be two of the A-group elements. Non-limiting examples of compounds having two A-group elements in the formula $M_{n+1}AX_n$ can include $Ti_3(Al_{1-x}Si_x)C_2$ for $0<x<1$.

The MAX Phase compound can be present in the MAX Phase composite in an amount in a range of about 25-95 wt. %, or about 50-70 wt. %, or about 60-65 wt. % by weight of the MAX Phase composite. The MAX Phase compound can have, for example, crystalline grains having an average particle size of about 0.1-100 μm, or about 0.1-50 μm, about 1-10 μm.

The oxide of A present in the MAX Phase composite can have an average particle size of about 0.1-50 μm, about 1-10 μm, or about 2-5 μm. The oxide of A can be present in the MAX Phase composite in an amount in a range of about 5-40 wt. %, about 10-30 wt. %, or about 15-20 wt. %, or about 16 wt. % by weight of the MAX Phase composite.

The MAX Phase composite can have less than about 10 wt. %, or less than about 5 wt. %, or less than about 1 wt. % of the carbide and/or nitride of M, or is substantially free of the carbide and/or nitride of M.

The resulting MAX Phase composite can have excellent thermal and electrical conductivity, oxidizing resistance, high density, high hardness, and high temperature mechanical properties. For example, the resulting MAX Phase composite can have an oxidizing resistance in an oxidizing atmosphere (such as in the air) at a temperature of at least 1400° C., 1500° C., 1600° C., or even 2000° C. The MAX Phase composite has a porosity less than 30 vol. %, or in a range of about 0-30 vol. %, about 0-20 vol. %, about 0-10 vol. %, or about 5-8 vol. %. The resulting MAX Phase composite is substantially free of micro-cracks as prepared and after grinding.

For example, the MAX Phase compound can be $Ti_3AlC_2$. The crystalline grains $Ti_3AlC_2$ can be plate shaped grains of about 1-50 μm or about 5-10 μm in length and about 1-10 μm or about 2-3 μm in thickness. The MAX Phase composite can further include $Al_2O_3$ having an average particle size of about 2-5 μm. The MAX Phase composite can also include $TiAl_3$. In some examples, the MAX Phase composite can further comprise metal Al. In some examples, the MAX Phase composite can further comprise $Ti_2AlC$. In embodiments, the MAX Phase composite may include less than about 10 wt. %, or about 5 wt. %, or about 1 wt. % of TiC, or is substantially free of TiC. The MAX Phase composite may include less than about 10 wt. %, or about 5 wt. %, or about 1 wt. % of Al, or is substantially free of Al.

For example, a MAX Phase composite produced by the methods of the disclosure can include $Ti_3AlC_2$ present in an amount in a range of about 20-95 wt. % or about 50-70 wt. %, $TiAl_3$ present in an amount in a range of about 5-40 wt. % or about 10-30 wt. %, $Al_2O_3$ present in an amount in a range of about 5-30 wt. % or 10-25 wt. %, and Al present in an amount in a range of about 1-25 wt. % or 5-15 wt. %, each by weight of the MAX Phase composite.

For example, a MAX Phase composite produced in accordance with the disclosure can have an average density of about 2-7, or about 3-6, or about 3.5-4, or about 3.62 g/cc, and an average porosity of about 0-30 vol. %, about 0-20 vol. %, about 0-10 vol. %, or about 5-8 vol. %, or about 7.73 vol. %.

EXAMPLES

Example 1: Fabrication of MAX Phase $Ti_3AlC_2$ Composite

A method in accordance with the disclosure was used to prepare a MAX phase composite article comprising the MAX phase $Ti_3AlC_2$. A precursor powder was prepared by blending TiC, $TiO_2$, and graphite powders. The TiC powder had an average particle size of about 3 μm (99.7% purity, Inframate Advanced Materials), the $TiO_2$ powder had an average particle size less than 5 μm particle size (rutile, 99.9% purity, Sigma-Aldrich), and the graphite powder had an average particle size of about 7-10 μm particle size (99% purity, Alfa Aesar). Specifically, the precursor powder was prepared by combining the powders of TiC, $TiO_2$, and C in a molar ratio of, TiC:$TiO_2$:C of 4:2:1, corresponding to 58.24:38.84:2.92 by weight ratio. The powders were then mixed at room temperature in a ball milling jar (Nalgene bottle) containing alumina grinding balls and ethanol (denatured, >99% purity, Thermo Fisher Scientific) to form a slurry. The weight ratio of grinding balls to the powder mixture was about 1:3. The weight ratio of the powder mixture to the denatured ethanol was about 3:2.

Figure 9:
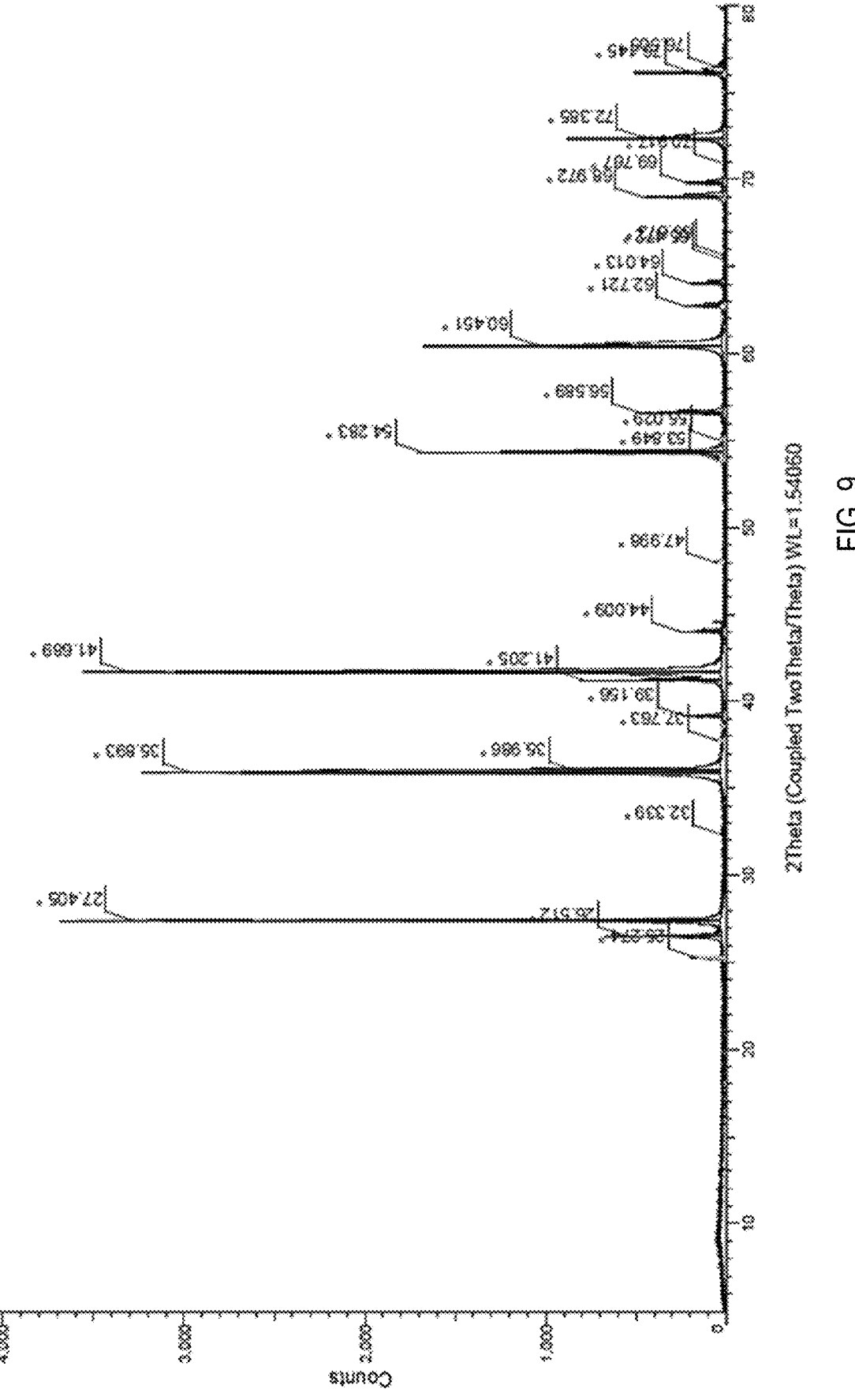
FIG. 9 is an X-ray diffraction pattern of precursor powder mixture of $TiC/TiO_2/C$ with molar ratio 4:2:1, showing TiC.

The slurry was ball-milled for about 12 hours using aggressive vibratory ball milling. The resulting slurry was vacuum dried in an oven at room temperature overnight. The dried powder mixture was subsequently dry ball-milled at about 60 rpm rolling speed for additional 4 hours. The grinding balls were then separated from the powder mixture using a sieve. The separated powder mixture was used as the precursor powder for making a green body. Referring to FIG. 9, the X-ray diffraction pattern of the vacuum dried precursor mixture of TiC/$TiO_2$/C with molar ratio of 4:2:1 showed that the powder mixture contained Khamarabaevite TiC phase, Rutile and Anatase $TiO_2$ phase, and graphite C phase. The ball-millings uniformly and homogeneously mixed the TIC, $TiO_2$, and graphite powders and resulted in a precursor powder having a reduced average particle size as compared to the initial powders.

The precursor powder was then used to form a green body by cold uniaxial pressing of the powder in a mold to form a disk.

Figure 10:
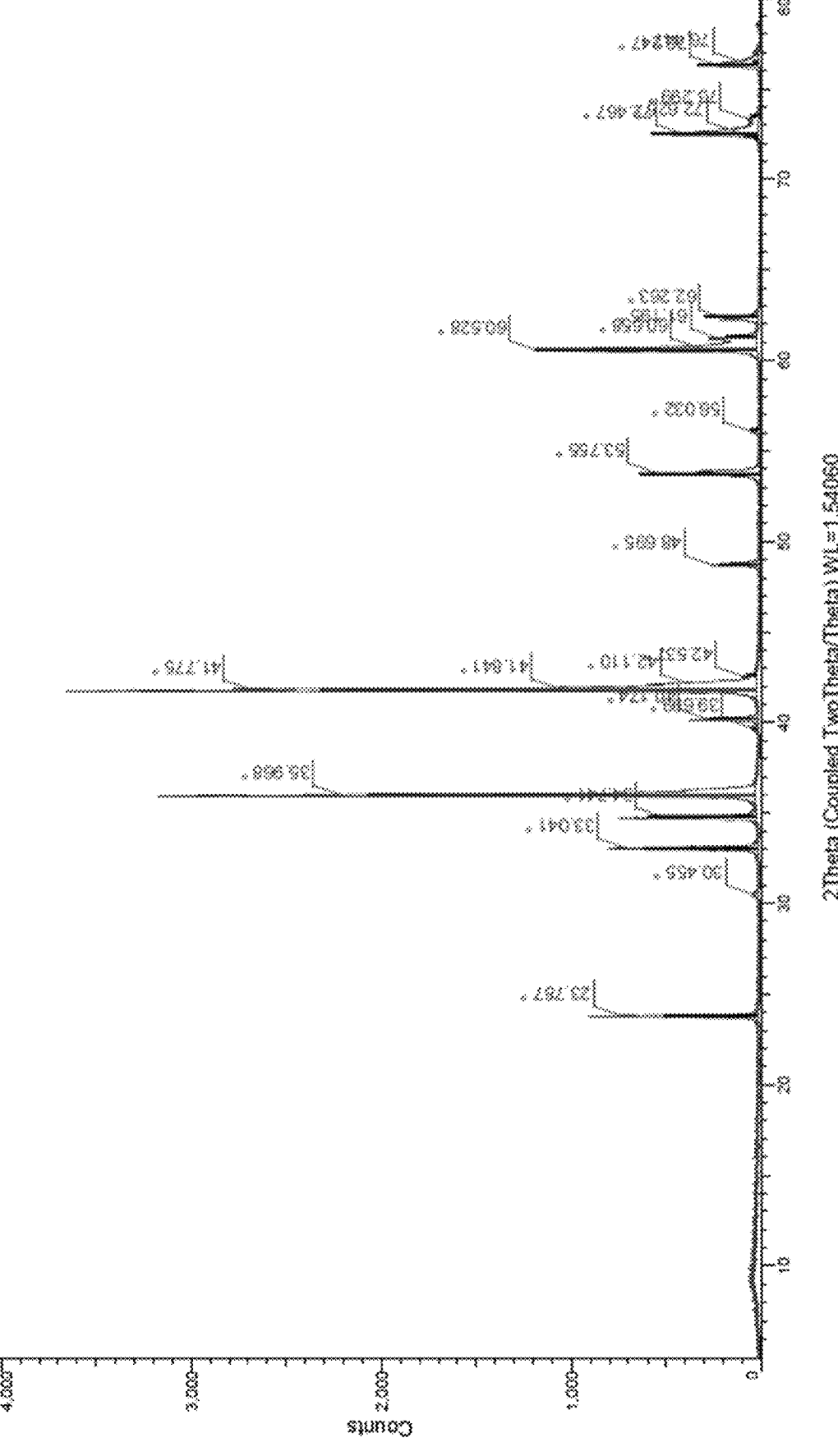
FIG. 10 is an X-ray diffraction pattern of crushed powder of $TiC/TiO_2/C$ pellet with molar ratio of 4:2:1 after 1400° C. pre-sintering to convert $TiO_2$ to $Ti_2O_3$.

The green body was then heated at 1400° C. for 30 minutes in an inert Ar flowing atmosphere as a pre-sintering process to thereby form a pre-sintered preform having substantially the same disk shape as the green body. The heating profile used in the pre-sintering process is shown in FIG. 3A. Referring to FIG. 10, the XRD pattern of the pre-sintered preform revealed that the formation of $Ti_2O_3$ phase after pre-sintering through partial reduction of the $TiO_2$ phase by C. Only $Ti_2O_3$ and TiC phase are visible in the XRD pattern, indicating that all $TiO_2$ was converted to $Ti_2O_3$, and all graphite carbon was consumed after the pre-sintering process. The pre-sintering process functions in the present system to convert $TiO_2$ to $Ti_2O_3$ and form a pre-sintered preform that is strong enough to withstand the melt infiltration. One of the reactions during pre-sintering is shown in Equation (1)

$$2TiO_2 + C => Ti_2O_3 + CO \uparrow \qquad (1)$$

Figure 11:
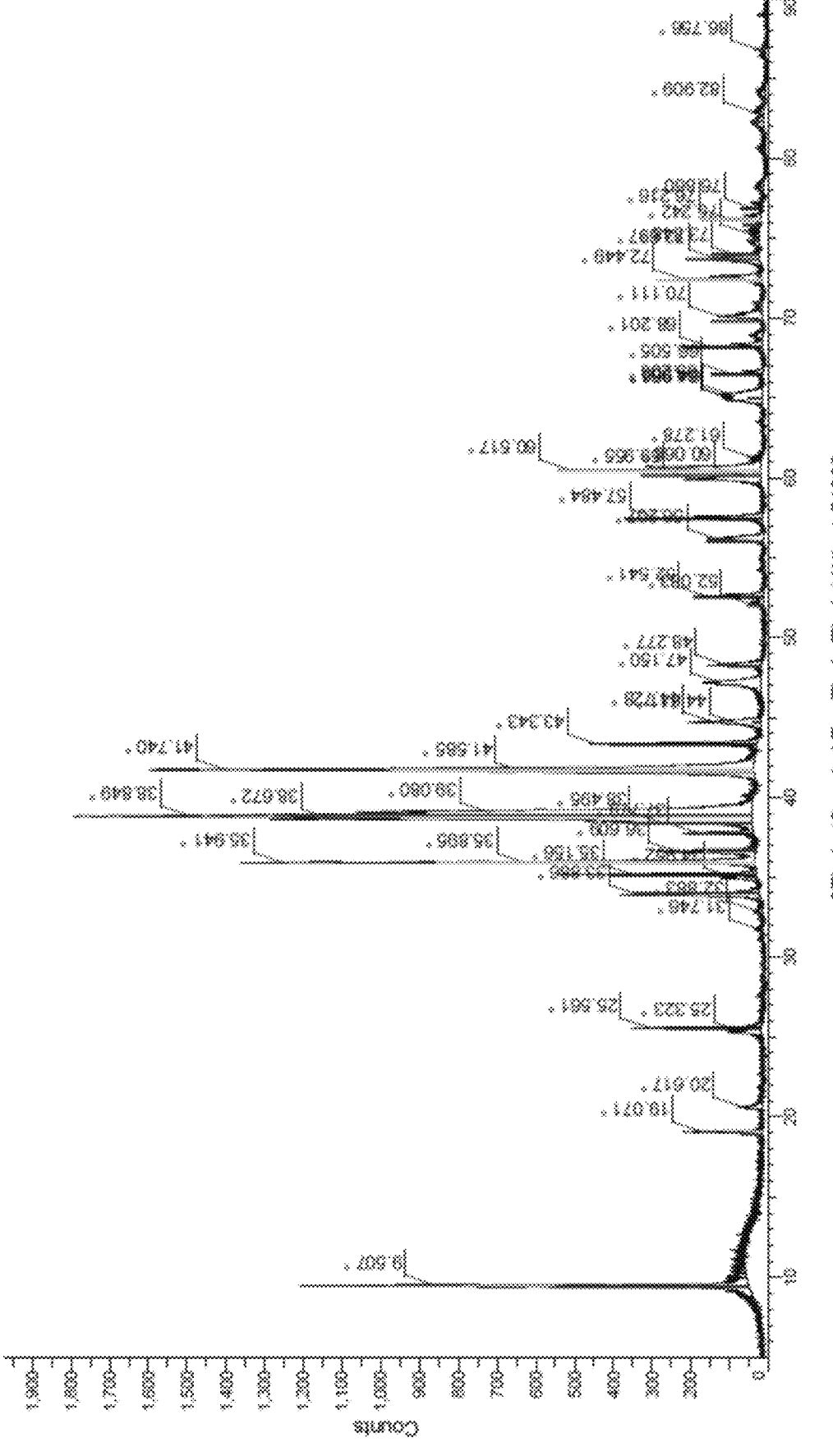
FIG. 11 is an X-ray diffraction pattern of crushed powder of a 1400° C. and 90 minutes aluminum infiltrated sample.

Reactive aluminum infiltration was then performed by placing an Al slug on top of the pre-sintered preform and heating to an infiltrating temperature of 1400° C. for 90 minutes to thereby form the MAX Phase composite in the disk shape. To prevent the samples from sticking to the alumina support plate used to support the preform, a coarse alumina powder was sprinkled onto the plate before placing the preform on the plate. The coarse alumina powder had a particle size of about 40 μm. FIG. 3B shows the heating profile used during the reactive aluminum infiltration. FIG. 11 shows the XRD pattern of the resulting MAX Phase composite. The XRD analysis indicates that the composite material contained MAX Phase $Ti_3AlC_2$, TiC, $Al_2O_3$, $TiAl_3$, and Al. Equations (2) and (3) describe the MAX Phase formation occurring in this method.

$$2TiC + Ti_2O_3 + 4Al => 2 Ti_2AlC + Al_2O_3 \qquad (2)$$

$$4TiC + Ti_2O_3 + 4Al => 2 Ti_3AlC_2 + Al_2O_3 \qquad (3)$$

The effect of pre-sintering was studied by attempting to infiltrate the green body without pre-sintering. A $TiC/TiO_2/C$ pressed pellet with an Al slug placed on top showed no wetting reaction after being heated to 800° C. in vacuum or after being heated up to 1200° C. in an Ar flowing environment. This observation led to the conclusion that the partial reduction of $TiO_2$ to form $Ti_2O_3$ achieved in the pre-sintering process was necessary for successful Al infiltration. The following Equations (4) and (5) represent the reactions that are believed to occur during the reactive infiltration process:

$$Ti_2O_3 + 8Al => 2TiAl_3 + Al_2O_3 \qquad (4)$$

$$TiAl_3 + 2TiC => Ti_3AlC_2 + 2Al \qquad (5)$$

Combining Equations (1), (4), and (5), leads to the overall reaction as shown following with alumina containing MAX phase $Ti_3AlC_2$ composite as product.

$$4TiC + 2TiO_2 + C + 4Al => 2Ti_3AlC_2 + Al_2O_3 + CO \uparrow \qquad (6)$$

$TiAl_3$ phase as an intermediate product very often exists in the resulting MAX phase $Ti_3AlC_2$ composites as a secondary phase in addition to $Al_2O_3$ Phase. Excess content of TiC can also help in reducing $TiAl_3$.

Cracking was observed on the top surface of the MAX Phase composite disk. Without intending to be bound by theory, it is believed that the cracking may be due to an excess amount of aluminum being present during infiltration and/or inhomogeneous distribution of Al during the infiltration process. When excessive Al exists in the infiltration system, Equation (5) suggests that reaction will move towards left direction, resulting in excessive amount of $TiAl_3$ and TiC. Intermetallic $TiAl_3$ phase exhibits high coefficient of thermal expansion (CTE) of $\approx 13 \times 10^{-6}$ (° $C.^{-1}$) when compared to MAX phase $Ti_3AlC_2$ and $Al_2O_3$ ($9.2 \times 10^{-6}$ and $8.6 \times 10^{-6 \circ}$ $C.^{-1}$, respectively). The existence of $TiAl_3$ phase in MAX phase composites can lead to excessive stress in the material and causing cracks during cooling. Also, densities of $TiAl_3$ (3.36 g/cm$^3$) and TiC (4.93 g/cm$^3$) are higher than that of Al (2.7 g/cm$^3$) and $Ti_3AlC_2$ (4.21 g/cm$^3$), respectively. Transformation of $2Al + Ti_3AlC_2 => TiAl_3 + 2TIC$ (the reverse reaction described by Equation 5) causes shrinkage in volume resulting in tensile stress in regions underwent such transformation and can lead to the formation of cracks in the MAX phase composite parts produced by Al infiltration.

Example 2: Fabrication of Crack-Free MAX Phase $Ti_3AlC_2$ Composite Samples Using Sacrificial Disk As noted in Example 1, crack formation is believed to be due to an excessive amount of aluminum being present during infiltration and/or inhomogeneous distribution of the Al during the infiltration. To estimate the weight of alumina with respect to the pre-sintered preform, an ideal situation was first considered as described in Equation (7), where no $TiAl_3$ or Al exists in the resulting material:

$$4TiC + Ti_2O_3 + 4Al \rightarrow 2Ti_3AlC_2 + Al_2O_3 \qquad (7)$$

For each one gram of preform sample after pre-sintering ($4TiC + Ti_2O_3$), this equation suggests that 0.282 gram of Al is needed for infiltration. Experimental results, however, indicated that about 0.5 gram of Al was needed to achieve complete infiltration for each gram of preform sample after pre-sintering. This specific weight is nearly doubled the value predicted by Equation (7).

Figures 12A, 12B, 12C:
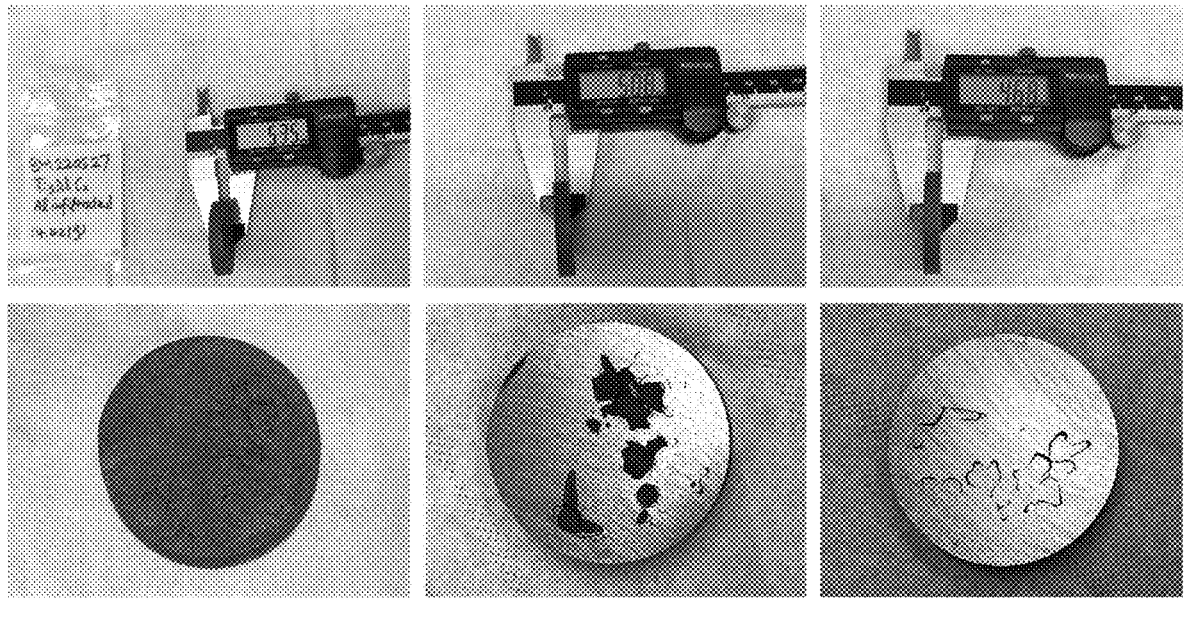
FIGS. 12A-12C are photographs of MAX phase composite sample prepared by Al infiltration, showing (A) the top surface, (B) the top surface after 0.27 mm of material was ground off, and (C) the top surface after 0.67 mm of material was ground off. Cracks remained visible even after 0.67 mm of material was ground off the top surface.

It was observed as discussed in example 1 that simply placing an Al slug on top of the pre-sintered preform for infiltration resulted in a composite having cracks on the top surface as shown in FIG. 12A. Shrinkage occurred in discrete regions during infiltration as evidenced by the forming of a $TiAl_3$ phase. Referring to FIGS. 12B and 12C, which show various levels of grinding off of the top surface, the cracks penetrated about 1 mm below the top surface. No cracking was observed on the bottom surface. Modification of the specific weight of Al used for infiltration allowed for formation of small (11.2 mm diameter) disks without cracking, but larger disks having 32 mm diameters still contained cracks on the top surface.

Figure 16:
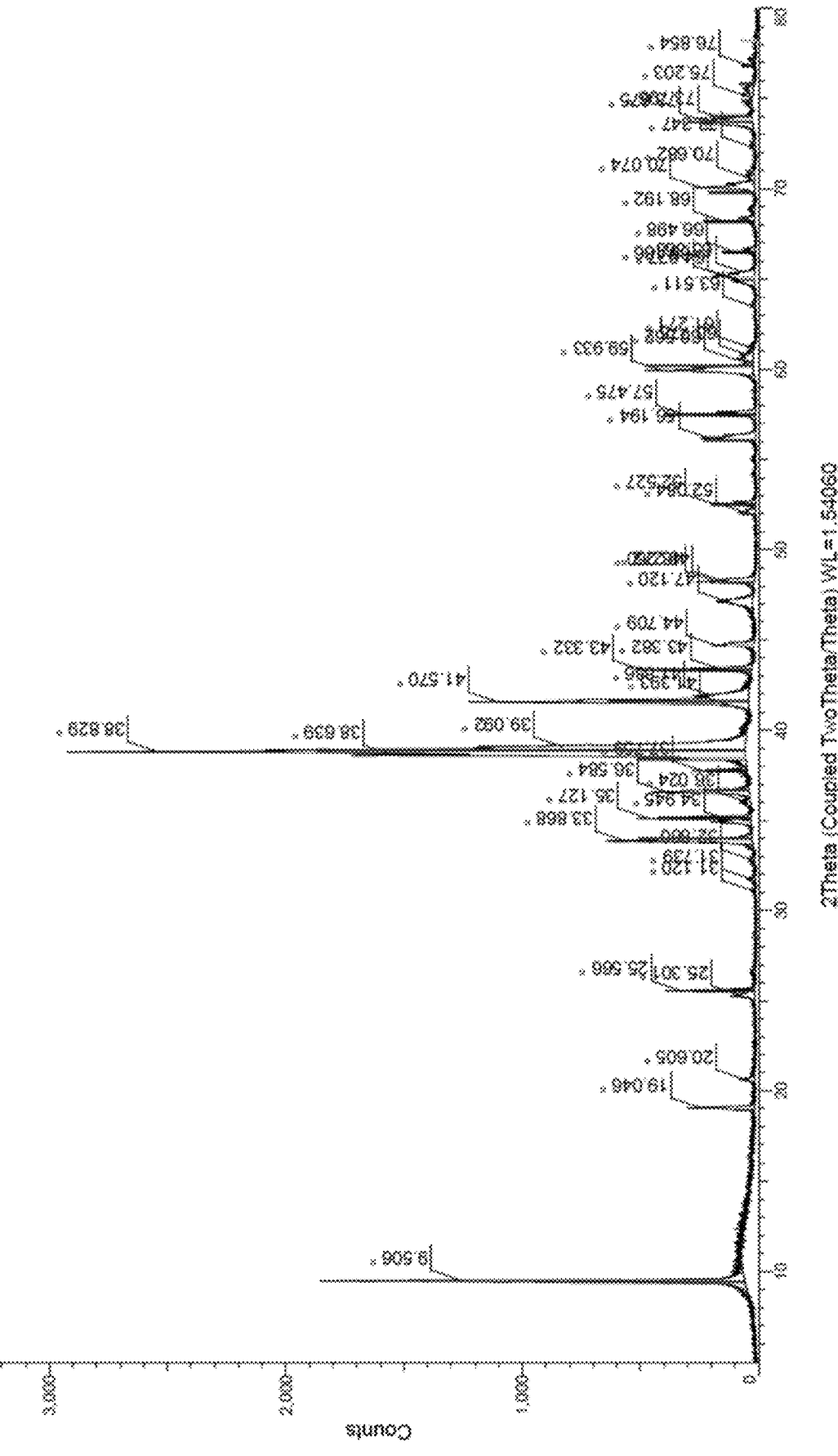
FIG. 16 is an X-ray diffraction pattern of a crushed powder of a crack-free MAX phase sample prepared by Al infiltration.

To overcome the cracking problem, a sandwich structure approach was utilized. Referring to FIGS. 13A-13C, the Al material for infiltrating was placed between two pre-sintered preforms to form a sample stack. Each pre-sintered preform was prepared as described in Example 1 and had a disk shape. The Al material used for infiltrating was in the form of circular pieces of Al. The sample stack was placed on an alumina plate dusted with alumina powder to prevent the resulting MAX Phase composite from bonding to the alumina plate during infiltration. Infiltration was performed by heating at 1400° C. for 90 minutes in Ar flowing atmosphere. FIG. 14A shows the stack after infiltration and FIG. 14B shows the two disks separated after infiltration. The upper disk shown in FIG. 14B is the sacrificial preform while the lower disk is the resulting MAX Phase composite article. No cracking was observed in the MAX Phase composite article. Without intending to be bound by theory, it is believed that the upper sacrificial disk absorbed any excess molten aluminum during the infiltration process and resulted in a more homogeneous distribution of aluminum in the lower disk during the infiltration process. FIGS. 15A and 15B show the resulting article, top and bottom surfaces, respectively, after polishing. No cracking was observed after polishing. The XRD pattern shown in FIG. 16 of the resulting article confirmed that the MAX phase compound was present. Automatic indexing identified the following different phases: MAX phase $Ti_3AlC_2$, corundum $Al_2O_3$, $TiAl_3$, and Al, in respective amounts of 62%, 16%, 13%, and 9% by weight, respectively. TiC phase was not detectable from XRD data.

FIG. 17 shows the bulk density of the resulting article, as determined by Archimedes' principle using isopropyl alcohol as surmising liquid. The resulting article had 92% of the theoretical density.

Table 1 provides the Vickers hardness measured for crack-free Al infiltrated disk composite sample, whereas Table 2 provides the Vickers hardness measured for Al infiltrated bar composite sample made previously. Vickers hardness of crack-free disk sample exhibit over 20% improvement when compared to that measured for Al infiltrated bar samples. The improvement is likely related to increase in $Al_2O_3$ and $TiAl_3$ contents and decrease in TiC content.

TABLE 1

Vickers hardness of crack-free Al infiltrated MAX
phase Ti—Al—C composite sample.
Hardness of crack-free Al infiltrated Ti—Al—C
composite Sample ID: BM220701B
Tested on Jul. 8 2022

| | 100 gf/10 sec | | 200 gf/10 sec | | 500 gf/10 sec | |
| --- | --- | --- | --- | --- | --- | --- |
| Sample# | Ti3AlC2 (HV0.1) | Gpa | Ti3AlC2 (HV0.2) | Gpa | Ti3AlC2 (HV0.5) | Gpa |
| 1 | 789.89 | 7.74 | 998.50 | 9.79 | 798.99 | 7.83 |
| 2 | 899.25 | 8.81 | 840.82 | 8.24 | 874.90 | 8.57 |
| 3 | 1052.15 | 10.31 | 1011.82 | 9.92 | 829.99 | 8.13 |
| 4 | 888.85 | 8.71 | 1030.93 | 10.10 | 1018.84 | 9.98 |
| 5 | 982.17 | 9.63 | 808.68 | 7.93 | 762.57 | 7.47 |
| 6 | 862.68 | 8.45 | 974.54 | 9.55 | 822.15 | 8.06 |
| 7 | 1044.75 | 10.24 | 1064.51 | 10.43 | 932.00 | 9.13 |
| 8 | 1009.82 | 9.90 | 998.27 | 9.78 | 967.56 | 9.48 |
| 9 | 873.87 | 8.56 | 931.28 | 9.13 | 950.82 | 9.32 |
| 10 | 852.82 | 8.36 | 1119.29 | 10.97 | 1037.94 | 10.17 |

TABLE 1-continued

Vickers hardness of crack-free Al infiltrated MAX
phase Ti—Al—C composite sample.
Hardness of crack-free Al infiltrated Ti—Al—C
composite Sample ID: BM220701B
Tested on Jul. 8 2022

| | 100 gf/10 sec | | 200 gf/10 sec | | 500 gf/10 sec | |
| --- | --- | --- | --- | --- | --- | --- |
| Sample# | Ti3AlC2 (HV0.1) | Gpa | Ti3AlC2 (HV0.2) | Gpa | Ti3AlC2 (HV0.5) | Gpa |
| 11 | 1051.54 | 10.31 | 989.09 | 9.69 | 927.02 | 9.08 |
| 12 | 837.63 | 8.21 | 979.77 | 9.60 | 811.68 | 7.95 |
| Average | 928.79 | 9.10 | 978.96 | 9.59 | 894.54 | 8.77 |
| STD | 89.62 | 0.88 | 82.67 | 0.81 | 86.69 | 0.85 |

TABLE 2

Vickers hardness of Al infiltrated MAX
phase Ti—Al—C composite sample.
Hardness of Al infiltrated Ti3AlC2
Sample ID: BM220405A
Tested on Apr. 6 2022

| | 100 gf/10 sec | | 200 gf/15 sec | | 500 gf/10 sec | |
| --- | --- | --- | --- | --- | --- | --- |
| Sample# | Ti3AlC2 (HV0.1) | Gpa | Ti3AlC2 (HV0.2) | Gpa | Ti3AlC2 (HV0.5) | Gpa |
| 1 | 720.84 | 7.06 | 782.27 | 7.67 | 768.48 | 7.53 |
| 2 | 709.30 | 6.95 | 737.12 | 7.22 | 746.67 | 7.32 |
| 3 | 850.92 | 8.34 | 881.48 | 8.64 | 721.91 | 7.07 |
| 4 | 807.38 | 7.91 | 758.10 | 7.43 | 784.60 | 7.69 |
| 5 | 712.09 | 6.98 | 691.80 | 6.78 | 793.01 | 7.77 |
| 6 | 675.08 | 6.62 | 608.20 | 5.96 | 681.83 | 6.68 |
| 7 | 770.28 | 7.55 | 773.00 | 7.58 | 659.80 | 6.47 |
| 8 | 673.10 | 6.60 | 788.77 | 7.73 | 702.53 | 6.88 |
| 9 | 789.74 | 7.74 | 736.54 | 7.22 | 755.41 | 7.40 |
| 10 | 762.08 | 7.47 | 822.76 | 8.06 | 790.42 | 7.75 |
| Average | 747.08 | 7.32 | 758.00 | 7.43 | 740.47 | 7.26 |
| STD | 55.68 | 0.55 | 69.94 | 0.69 | 44.70 | 0.44 |

Figure 18A:
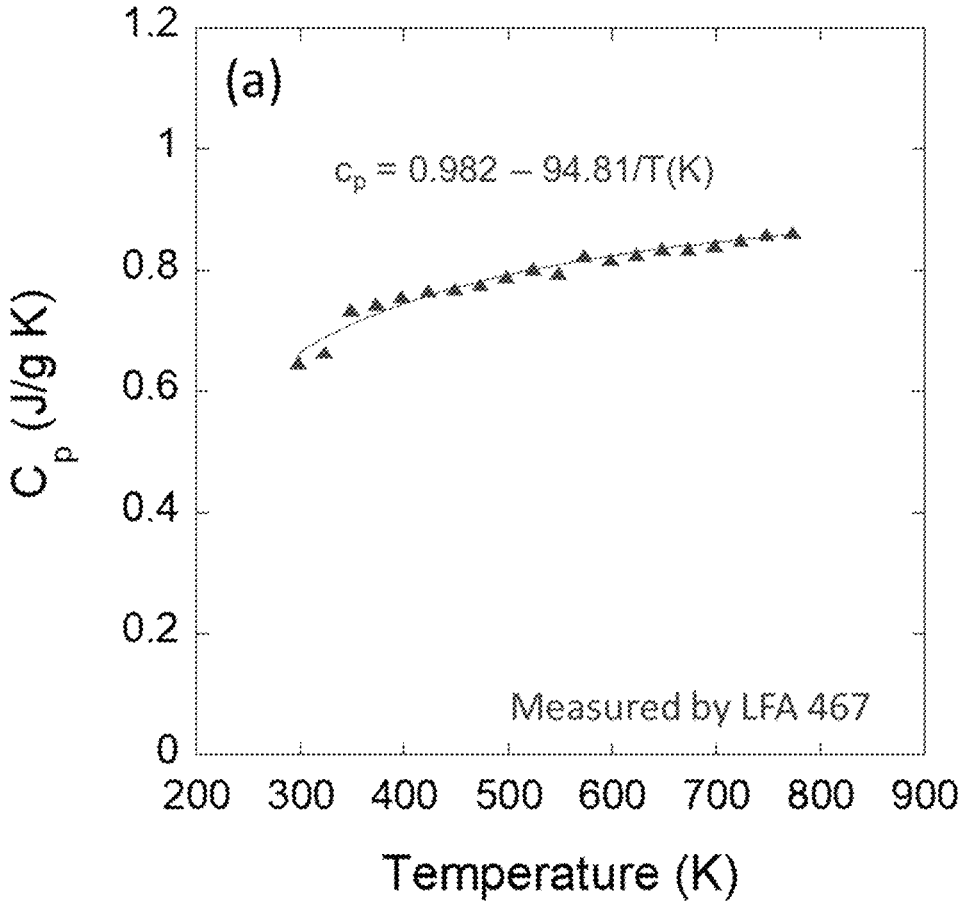
Figures 19C, 19D:
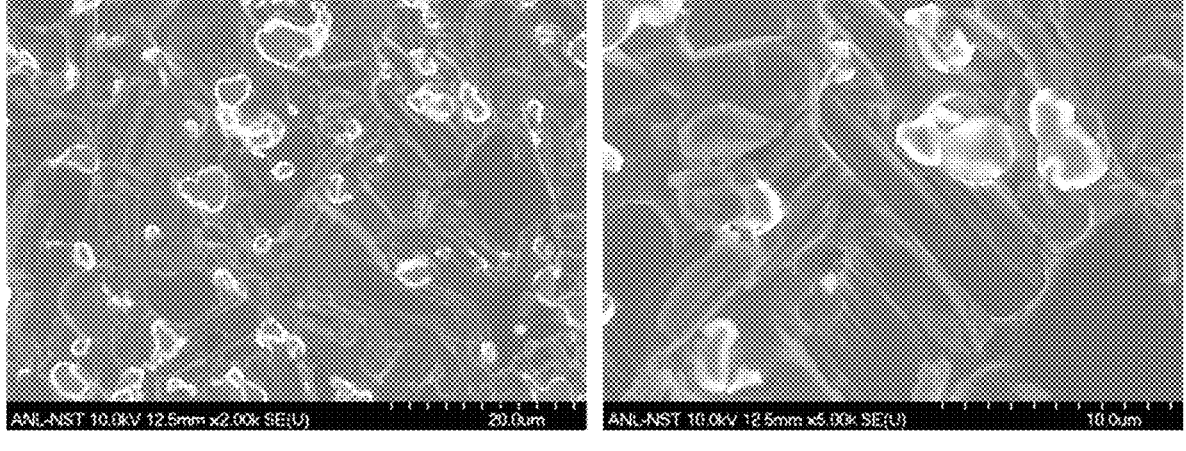

FIGS. 18A and 18B shows the temperature dependent specific heat capacity, thermal diffusivity, and thermal conductivity of resulting article. Measurements were conducted using a NETZSCH LFA467 HyperFlash instrument in helium flowing atmosphere. The thermal conductivity was ≈15% higher at 400° C. when compared to previously reported values by value reported by Qian et al., *Electrical and Thermal Properties of $Ti_3AlC_2$ at High Temperature*, J. Ceram. Sci. Tech., 02, 115-158 (2011).

Figure 20:
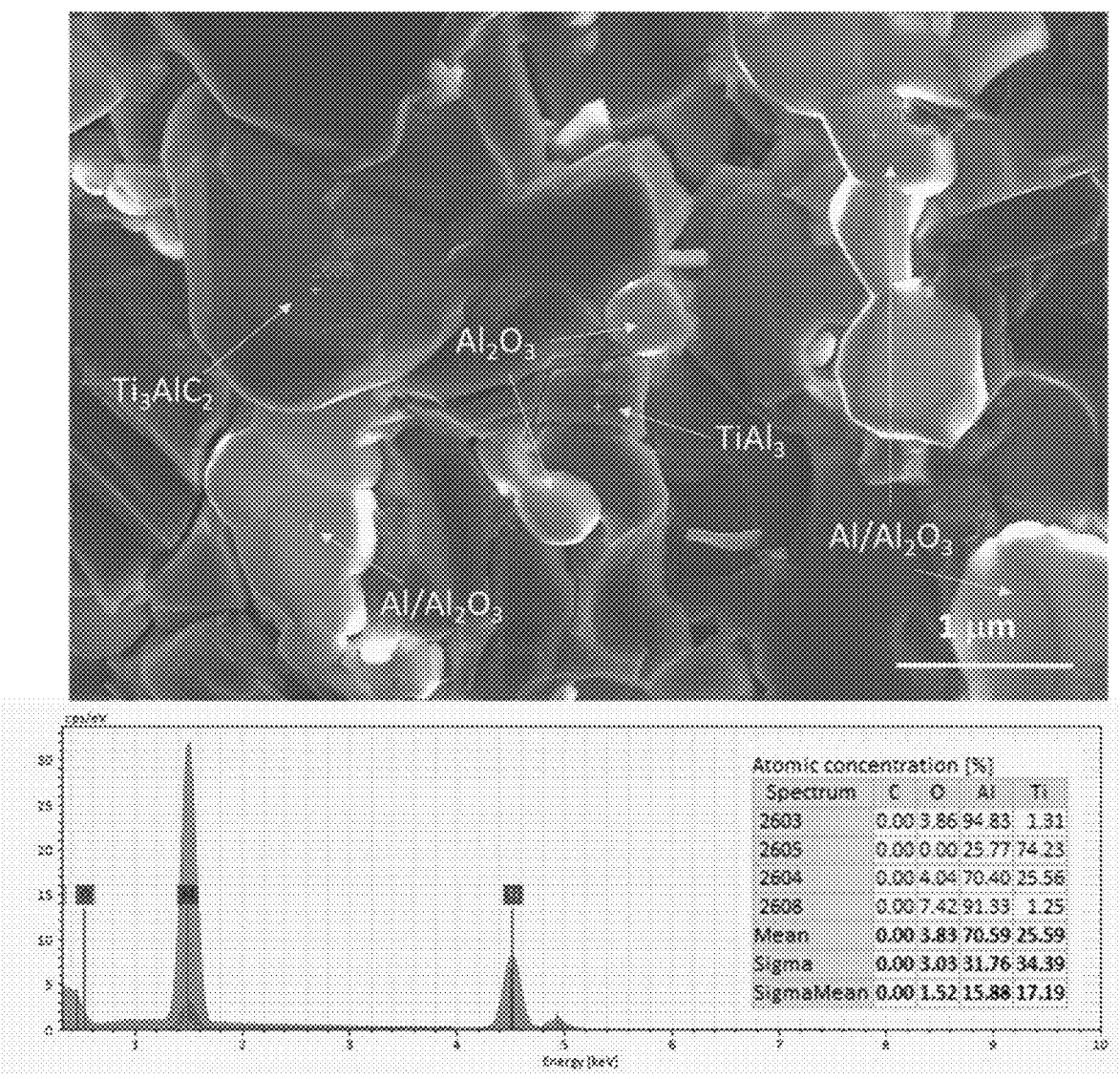
FIG. 20 is an SEM micrograph and associated EDX analysis of a 1400° C. Al infiltrated MAX phase composite sample.

FIGS. 19A to 19D shows fracture surface SEM micrographs of the resulting article. Needle shaped MAX phase $Ti_3AlC_2$ phase grains are clearly visible, in good agreement with X-ray diffraction peaks for $Ti_3AlC_2$ phase shown in FIG. 16. In addition, spherical shaped $Al_2O_3$ phase and irregular shaped phase were observed. Their chemical contents were examined by energy dispersive X-ray (EDX) spectroscopy elemental analysis, as shown in FIG. 20.

Example 3: Fabrication of Crack-Free MAX Phase $Ti_3AlC_2$ Composite Samples Using Sacrificial Disk The sandwich approach of Example 2 was used to produce a MAX Phase Composite disk article. A green body was prepared as described in Example 1 using a precursor powder having a 4:2:1 molar ratio of $TiC/TiO_2/C$. The pre-sintered preforms were formed by heat treating the green body using a heating profile as shown in FIG. 3A. Two disk sizes were prepared as shown in FIG. 4A. One pre-sintered preform was used as the pre-sintered preform for Al infiltration and one was used as the sacrificial pre-sintered preform in the sandwich approach. The infiltrating material was an aluminum disk having the same diameter as the pre-sintered disk. The aluminum disk was placed between the pre-sintered preform and the sacrificial pre-sintered preform as described in Example 2 and shown in FIG. 4B, with the pre-sintered preformed disposed on the bottom. Al infiltration was performed with the stack supported on an alumina support and a coarse alumina powder was sprinkled on the support before the stacks were placed thereon. Al infiltration was performed by heating the stacks at 1400° C. for 90 min in Ar flowing atmosphere. FIG. 4C shows the resulting stacks after Al infiltration.

FIGS. 5A and 5B show the top and bottom surfaces, respectively of the resulting MAX Phase composite disks. The XRD pattern shown in FIG. 6 confirmed the presence of $Ti_3AlC_2$, $TiAl_3$, and $Al_2O_3$ phases. Minute titanium carbide ($TiC_x$) phase, which is not detectable by XRD, may be present in the resulting disks.

Referring to FIGS. 7A and 7B, fracture surface SEM showed plate shaped grains (5 to 10 μm long and 2 to 3 μm thick) of MAX phase $Ti_3AlC_2$ and light-colored spherical shape particles (2 to 5 μm in size) of $Al_2O_3$ phase. FIGS. 8A-8F shows the SEM EDX mapping confirming the presence of these phases. Absence of $TiC_x$ phase may be played a role in the prevention of crack formation.

Example 4: Fabrication of MAX Phase Composite Tubes

To demonstrate the applicability of the methods of the disclosure in forming various shapes of articles, tubes of the MAX Phase composite material were formed. A preform tube of 36 mm inner diameter and 42 mm outer diameter was prepared by pressing the precursor powder described in Example 1 (4:2:1 molar ratio $TiC/TiO_2$/C) into a graphite die. FIG. 2 is a schematic illustration of the die used. The green body in the tube shape is shown in FIG. 21A. The tube-shaped green body was pre-sintered by heating in a tube furnace at 1400° C. in Ar flowing atmosphere. FIGS. 21B and 21C show the tube after pre-sintering.

A sacrificial pre-sintered preform was prepared for infiltration using the same precursor powder and pre-sintering conditions used for the tube. The sacrificial pre-sintered preform was formed into the same of a disk having a diameter of about 32 mm, such that it was capable of fitting inside the pre-sintered preform tube.

A circular shaped $Al_2O_3$ crucible of about 50 mm diameter was dusted with alumina powder and used to contain the pre-sintered preform tube for infiltration. The sacrificial pre-sintered preform disk was placed inside the pre-sintered preform tube. A gap between the pre-sintered disk and the pre-sintered preform tube was filled with aluminum pieces and additional aluminum was placed on the top surface of the pre-sintered preform tube as shown in FIG. 21D. The crucible having this assembly was placed on an alumina tray and then placed inside a tube furnace for Al infiltration. Al infiltration was performed using the same conditions as in Example 2.

Figure 22A:
FIGS. 22A-22C are photographs of (A) a MAX phase composite tube after Al infiltration, (B) a top view of the tube and (C) a side view of the tube.
Figure 22B:
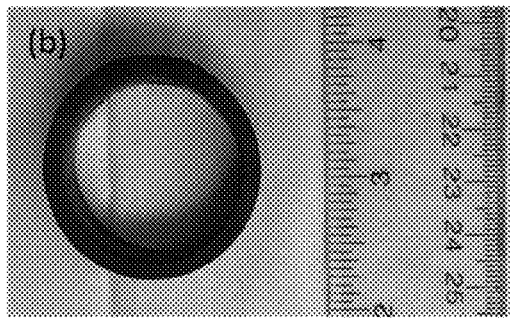
Figure 22C:
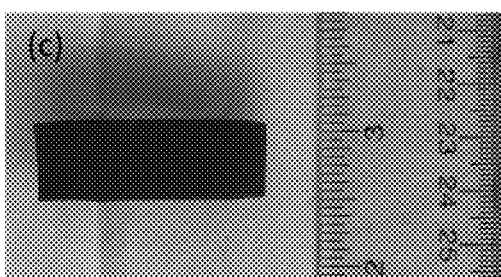

FIG. 22A is a photograph of the MAX Phase composite tube resulting after Al infiltration. The tube is still residing in the crucible and the sacrificial pre-sintered preform disk is still present in the tube. FIGS. 22B and 22C are top and side view images of the composite tube after surface cleaning. The dusting of alumina powder was found to successfully prevent any bonding or sticking of the composite to the crucible.

Figure 23:
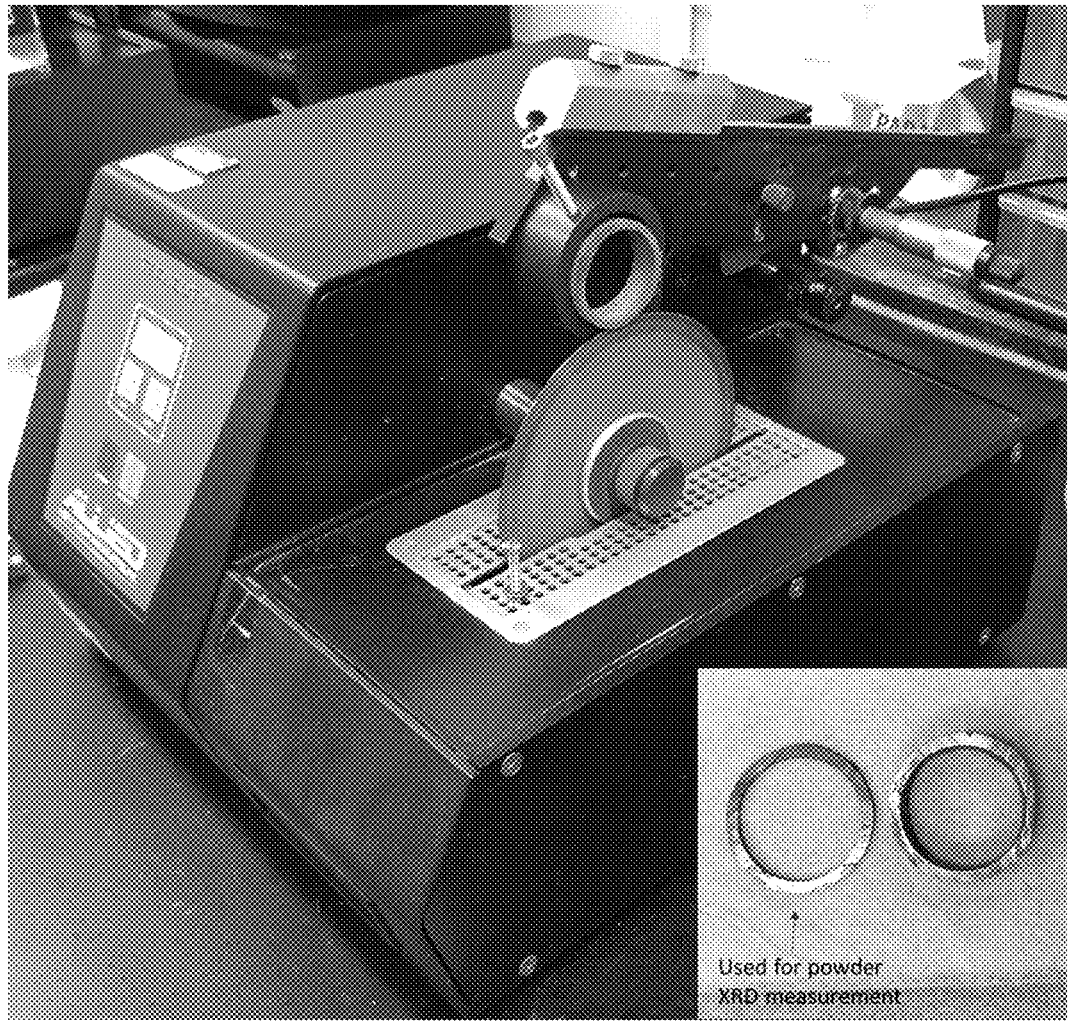
FIG. 23 is a photograph of the equipment set up used for cutting a piece off the MAX phase tube prepared by Al infiltration for powder X-ray diffraction analysis, and the piece cut off the tube (shown in insert)
Figure 24:
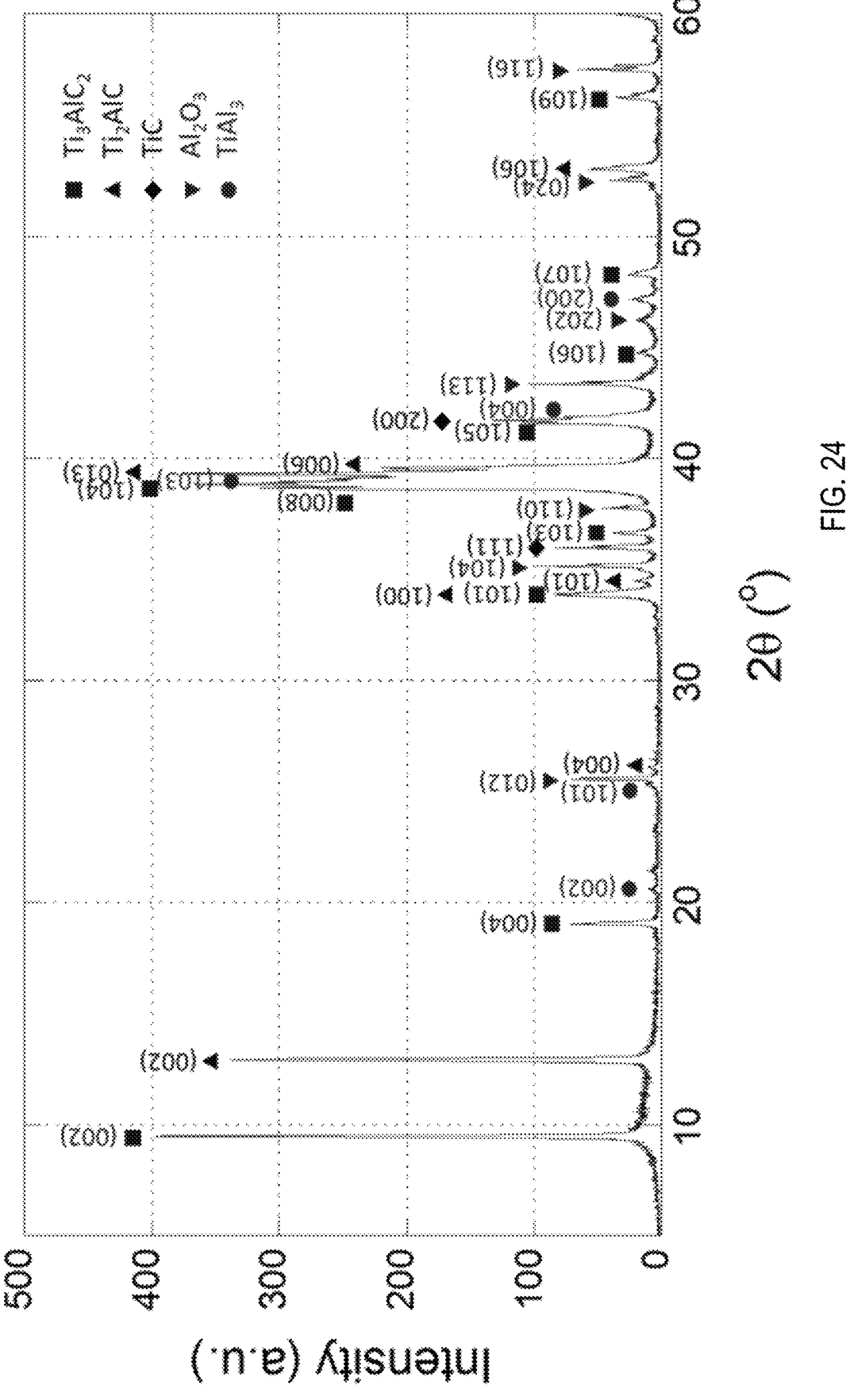
FIG. 24 is an X-ray diffraction pattern of a MAX phase composite tube prepared by aluminum infiltration.

X-ray diffraction analysis was preformed using a cut piece of the as-formed composite tube. FIG. 23 shows the apparatus set-up for cutting a piece of the tube and the resulting cut portion. The cut piece was crushed to form a powder for XRD analysis. The XRD pattern is shown in FIG. 24. All diffraction peaks can be indexed according to JCPD cards for, $Ti_3AlC_2$ (01-074-8806), $Ti_2AlC$ (01-087-7462), (Ti,Al) C (01-083-9834), $Al_2O_3$ (01-089-7715), and $TiAl_3$ (01-072-5006). Phase composition of the resulting MAX phase tube was determined as 33%, 36%, 10%, 12%, and 9%, respectively for $Ti_3AlC_2$, $Ti_2AlC$, (Ti, Al) C, $Al_2O_3$, and $TiAl_3$, as shown in Table 3 below. Unlike the MAX phase disk samples prepared by Al infiltration, MAX phase tube samples prepared by Al infiltration consisted of substantial amount of "MAX phase 211", i.e., $Ti_2AlC$ phase.

TABLE 3

| Phase composition of MAX phase tube prepared by Al infiltration. | | |
| --- | --- | --- |
| Phase Component | JCPD Card # | Content (%) |
| $Ti_3AlC_2$ | 01-074-8806 | 32.54 |
| $Ti_2AlC$ | 01-087-7462 | 35.68 |
| (Ti, Al)C | 01-083-9834 | 10.17 |
| $Al_2O_3$ | 01-089-7715 | 12.21 |
| $TiAl_3$ | 01-072-5006 | 9.41 |

Figure 25A:
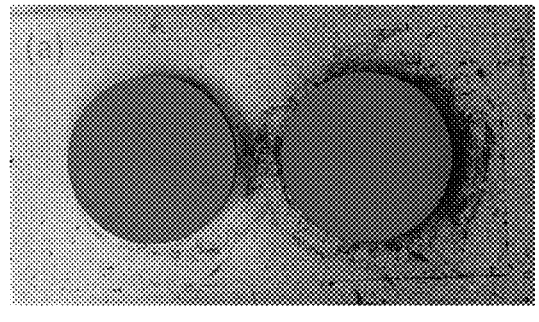
FIGS. 25A-25D are photographs of (A) as pressed pellets, (B) the pellets after pre-sintering at 1400° C. for 90 minutes in Ar flowing atmosphere, and (C, D) a pressed tube made of powder mixture contain Al powder additive.
Figure 25B:
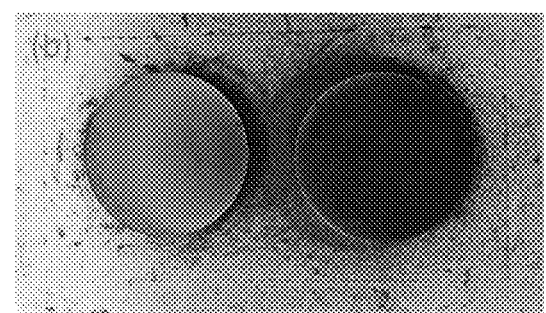

Example 5: Fabrication of MAX Phase $Ti_3AlC_2$ by Co-Firing Al Infiltration Process 10 grams of the precursor powder described in Example 1 was used to prepare green bodies in the form of pressed pellets, as shown in FIG. 25A. The pressed pellets were pre-sintered in a tube furnace at 1400° C. for 90 min in Ar flowing atmosphere. FIG. 25B shows the pre-sintered preform pellets resulting after the pre-sintering process. After pre-sintering a weight loss of about 10.5% was observed due to the reduction described in Equation (1) above. The two pre-sintered preformed pellets were crushed, resulting in 17.9 grams of powder. 7.4 g of aluminum powder was added to this pre-sintered preform powder and dry mixed inside a Nalgene bottle with about 200 g alumina grinding balls for 3 hours.

Figure 25C:
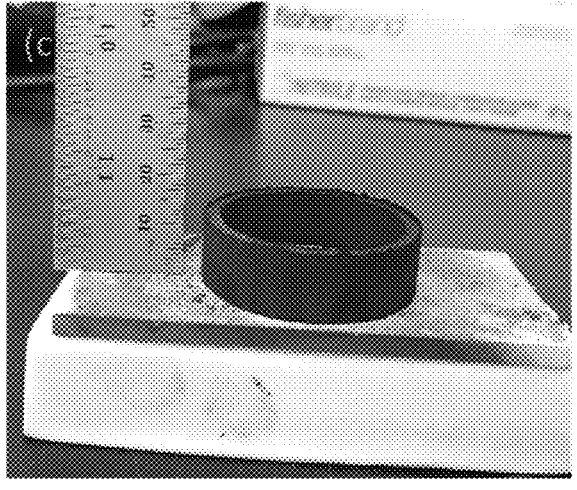
Figure 25D:
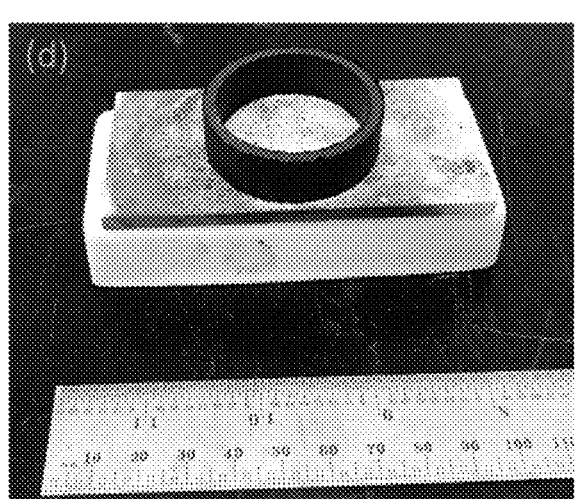
Figure 26A:
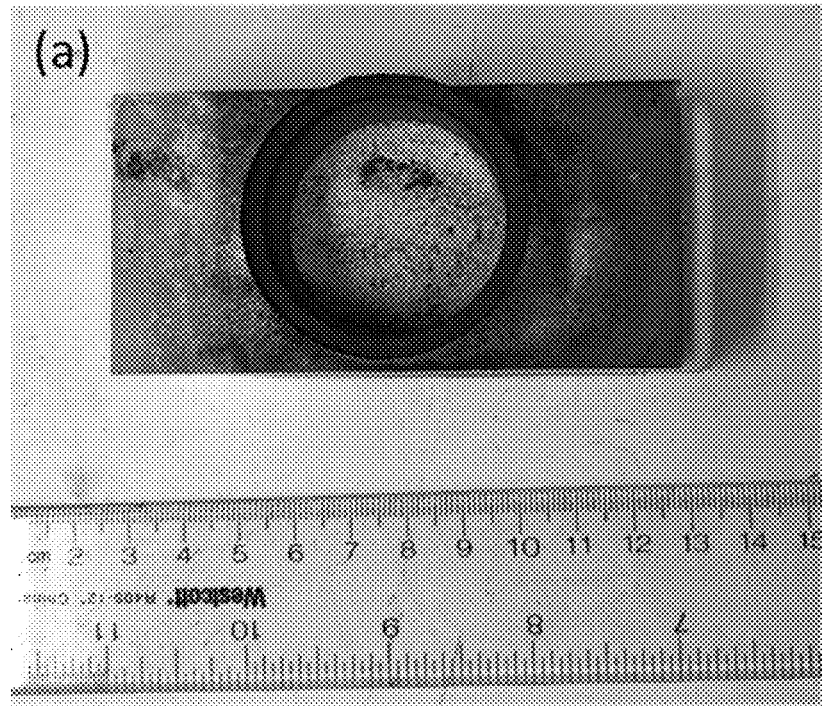
FIGS. 26A-26E are photographs of (A, B) a MAX phase tube after 1400° C. for 90 minutes sintering in Ar flowing atmosphere, (C) a top view of the tube, (D) a side view of the tube, and (E) a bottom view of the tube.
Figure 26B:
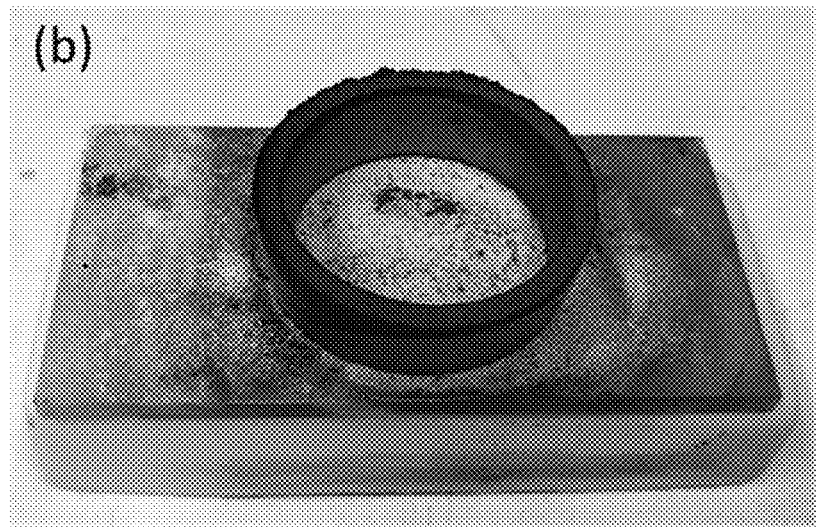
Figures 26C, 26D, 26E:
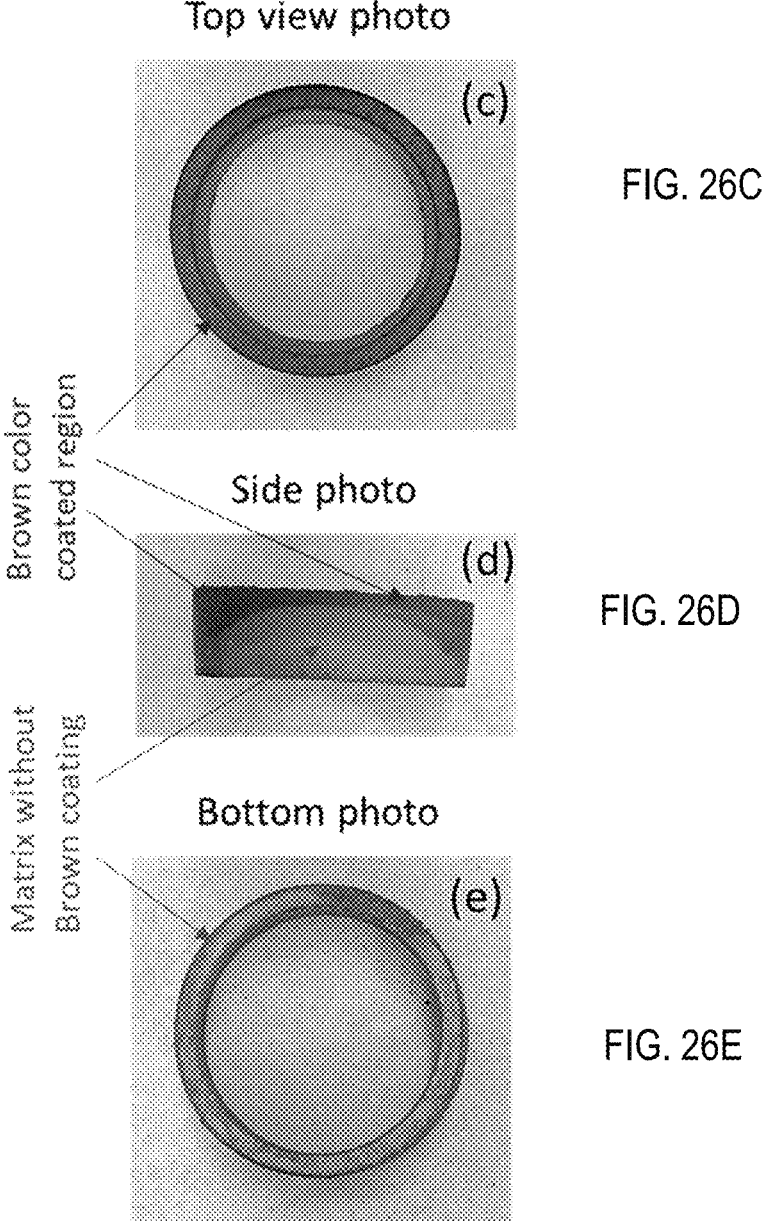

The 12 g resulting powder mixture was pressed into a tube-shaped die as described in Example 4 to from a green body tube as shown in FIGS. 25C and 25D.

Figure 27A:
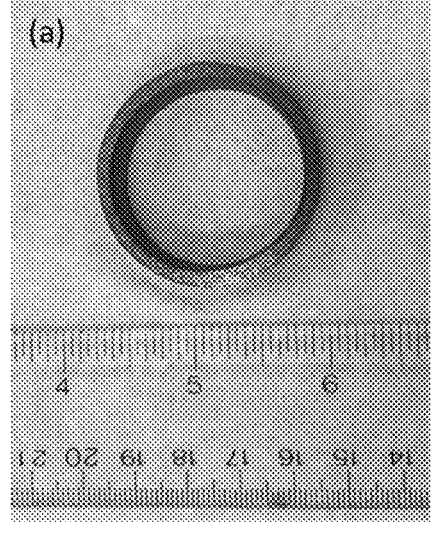
FIGS. 27A-27C are photographs after surface grinding of a MAX phase tube made by sintering at 1400° C. for 90 minutes in Ar flowing atmosphere, (A) is a top view of the tube, (B) is a bottom view of the tube, and (C) is a side view of the tube.
Figure 27B:
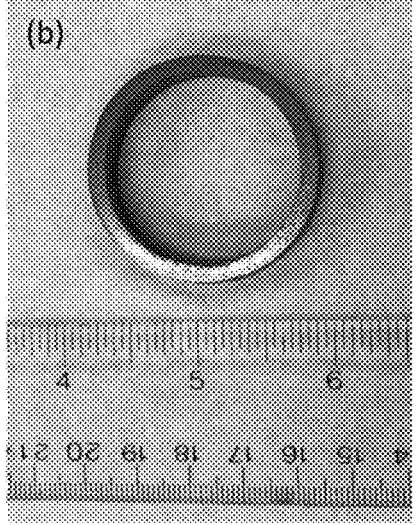
Figure 27C:
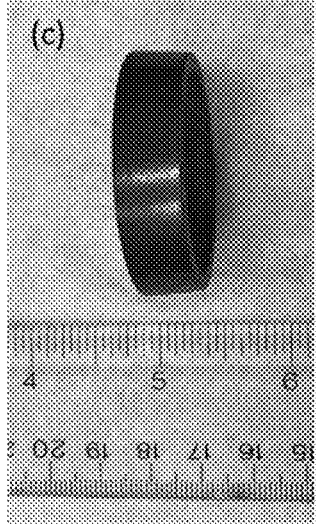
Figure 28A:
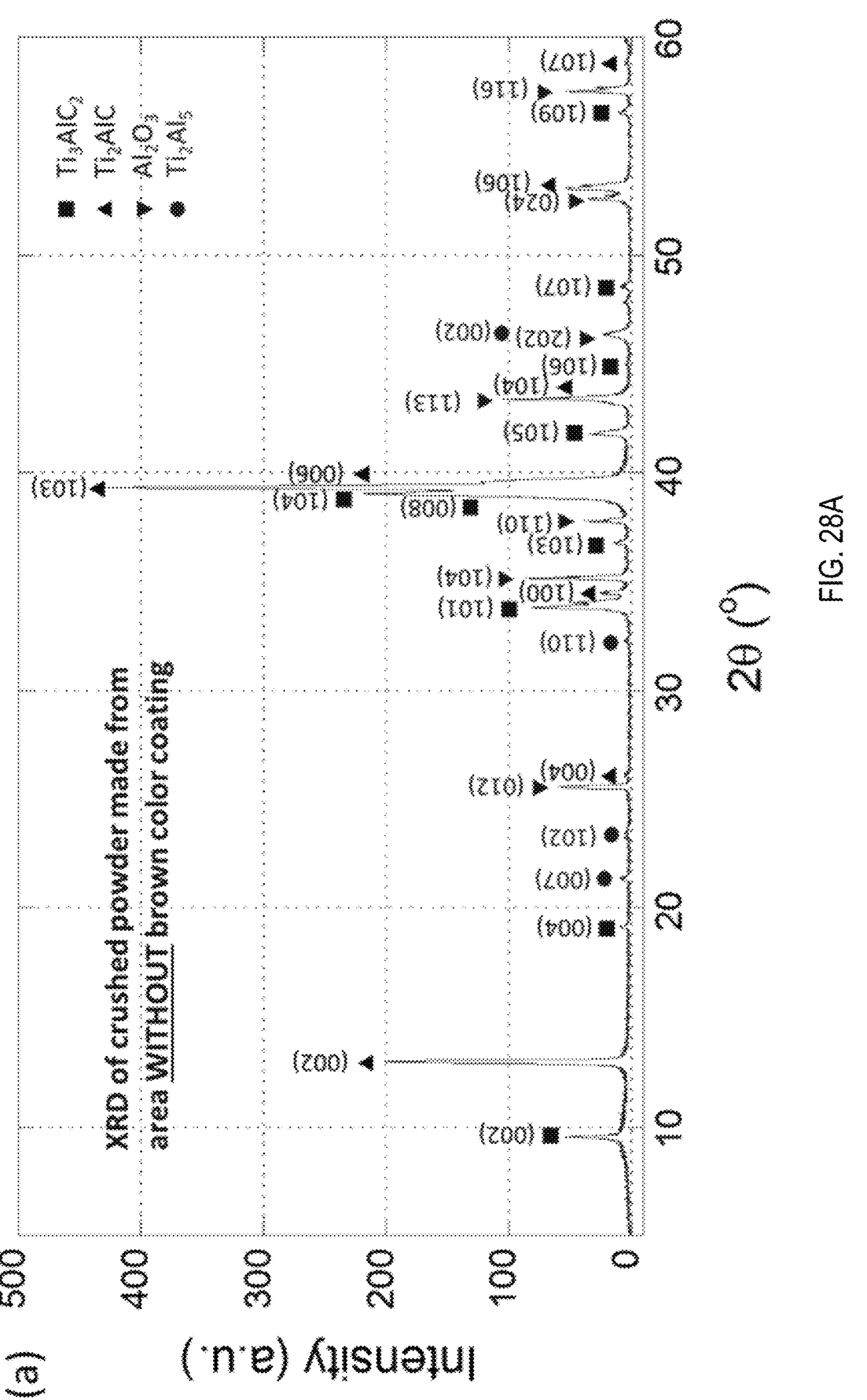
FIGS. 28A-28B are X-ray diffraction patterns of a crushed powder prepared from different sections of MAX phase tube made by sintering at 1400° C. for 90 minutes in Ar flowing atmosphere, wherein (A) shows the XRD pattern of a crushed powdered prepared from a section of the tube that did not have a brown color coating and (B) shows the XRD pattern of a crush powder prepared from a section of the tube having the brown color coating.
Figure 28B:
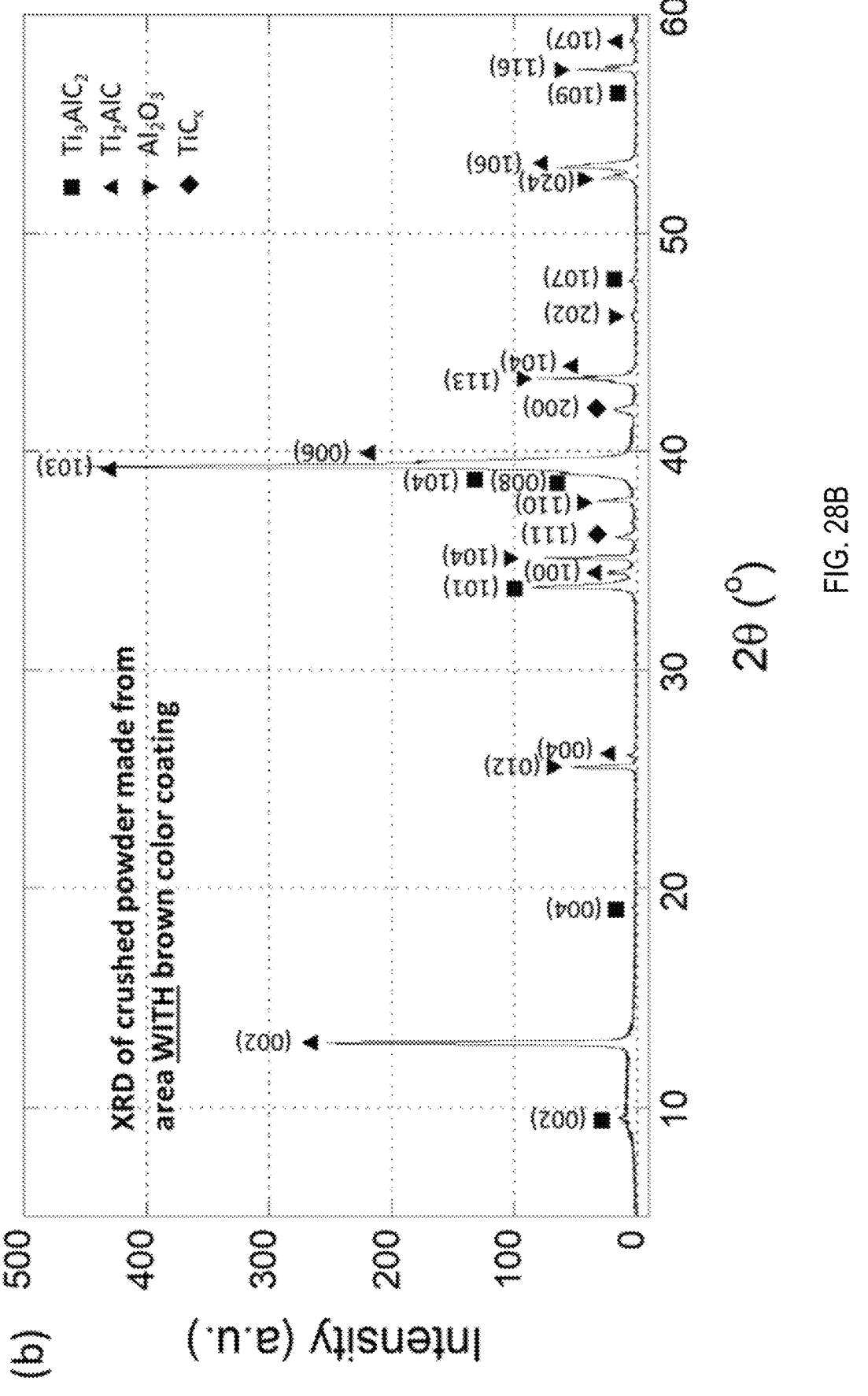

The green body tube was loaded in a tube furnace for sintering at 1400° C. for 90 min in Ar flowing atmosphere using the heating profile shown in FIG. 3B. FIGS. 26A-26E are photographs of the resulting MAX Phase composite tube after removal from the tube furnace. A top portion of the resulting composite tube was coated with a brown color powdery coating, while a lower portion appeared dark grey in color, similar to the pellets made in Example 2. The brown color powdery coating was only on the surface of the composite tube and was easily removed by grinding. FIGS. 27A-27C show the composite tube after surface grinding. Samples of the composite tube were cute from the dark gray area and the area having the brown powdery coating. The samples were ground into a powder for XRD analysis. FIGS. 28A and 28B show the XRD pattern of the dark gray area and the area with the brown powdery coating, respectively. Both samples were confirmed to be MAX Phase composites containing a MAX Phase compound and $Al_2O_3$. The area without the brown color coating contained $TiAl_x$ as secondary phase, while the area under the brown powdery coating contained TIC as the secondary phase.

Example 6: Two Stage Infiltration Process

Figure 29A:
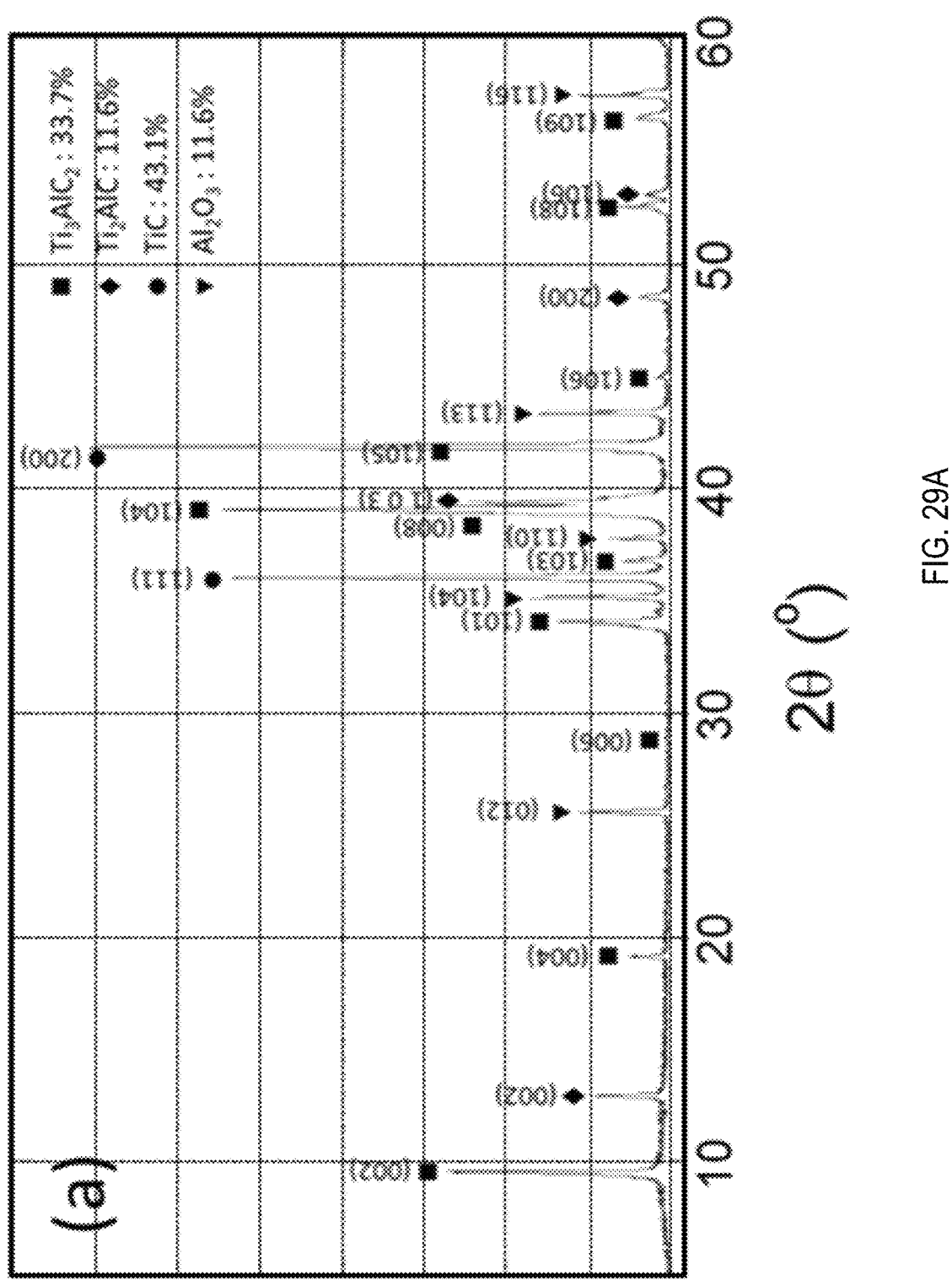
FIGS. 29A and 29B are powder XRD patterns of samples made in accordance with the disclosure with $2TiC+0.5Ti_2O_3+1.5Al$ precursor (A) after co-sintering and (b) after subsequent infiltration of additional 1.5 Al.
Figure 29B:
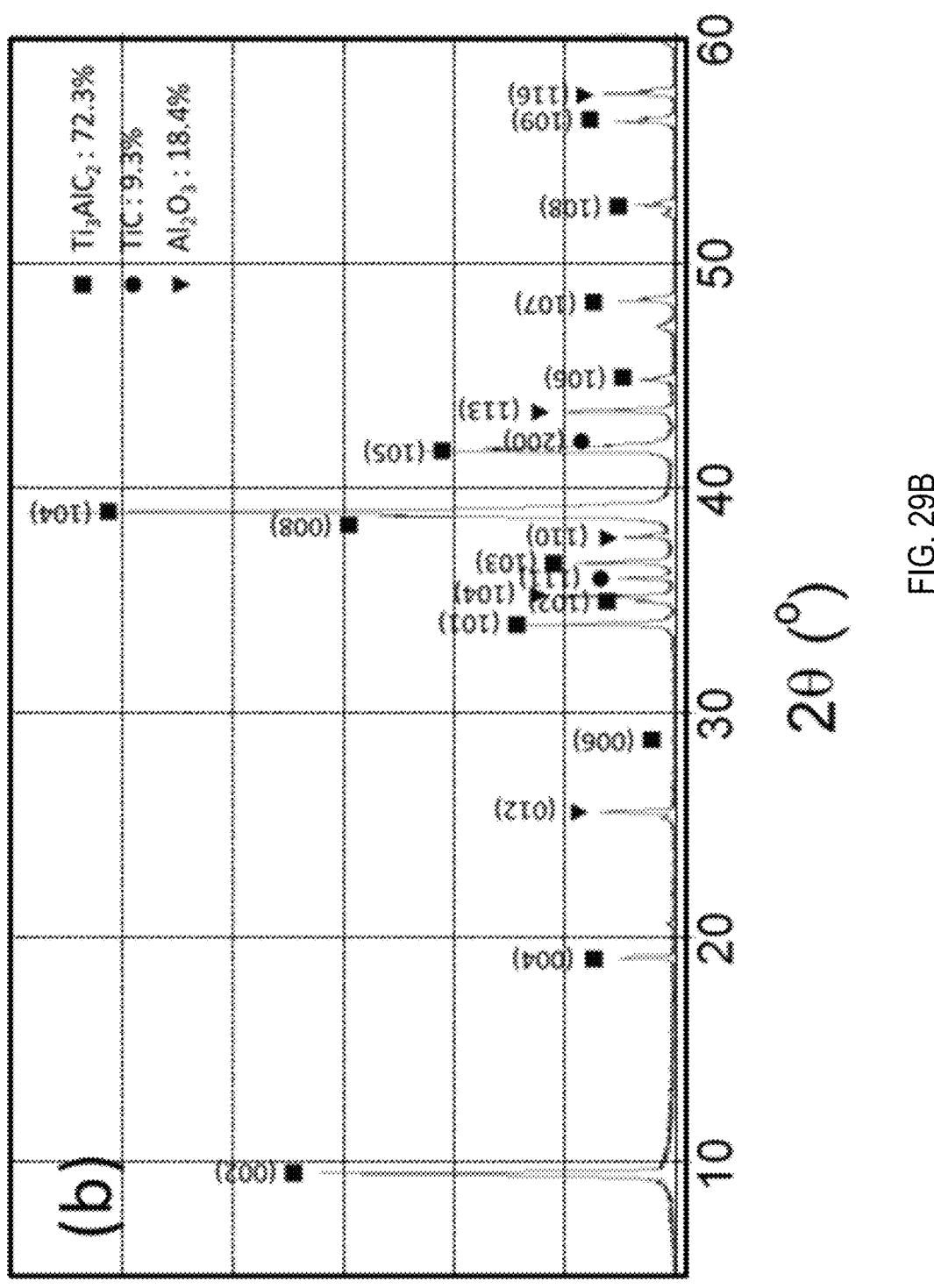

A two-stage infiltration process in accordance with the disclosure was used for forming a MAX phase precursor mixture. The precursor powder containing TiC, $TiO_2$, and C was wet ball milled and vacuum dried. The precursor powder was then pre-sintered to convert $TiO_2$ to $Ti_2O_3$. Then Al powder was blended into the pre-sintered precursor powder in an amount such that the admixture was 2TiC+ $0.5Ti_2O_3$+yAl. A green body was then formed from the admixture by pressing or printed by binder jetting. The green body was then heated to co-sinter (melt infiltration) y portion of Al containing green body. Subsequent Al infiltration of (3-y) part Al was conducted at $\approx 1400°$ C. for 90 min. in Ar flowing atmosphere. Samples with y=1, 1.5, and 2 were formed. FIG. 29A shows XRD patterns of sample made with precursor powder containing 1.5Al (or 21 wt % Al with respect to the weight of $2TiC+0.5Ti_2O_3$ mixture) after co-sintering at 1400° C. for 90 min. in Ar flowing atmosphere. FIG. 29B shows XRD pattern of the sample after subsequent Al melt infiltration of additional 1.5Al into the sample. Total MAX phase fraction (312 phase+211 phase) in resulting composite sample is ~45% after co-sintering heat treatment (FIG. 2a), and it increased to ~72% after subsequent Al infiltration (FIG. 2b). Bulk Density of samples after subsequent Al infiltration increased to >70%. With this two-step process, increased MAX phase content in MAX phase composite was achieved, as well as increased bulk density of >70% of the theoretical value.

By comparison, subsequent Al infiltration of a MAX phase composite displayed increased bulk density of about 15%, but the MAX phase fraction decreased significantly from 70% to 36% due to the fact that excessive Al content in the system pushed the following equation towards the left.

$$TiAl_x + 2TiC => Ti_3AlC_2 + (x-1)Al, \text{ where } x \geq 1 \qquad (40)$$

In the comparative sample, the MAX phase composite was subsequently Al infiltrated at about 1400° C. for 90 min in flowing atmosphere. The composite material prior to the subsequent Al infiltration was formed from a powder mixture containing $2TiC+0.5$ $Ti_2O_3$+3Al (or 42 wt % of aluminum with respect to the weight of the powder mixture of 2 $TiC+0.5$ $Ti_2O_3$ after pre-sintering heat treatment). This material was co-sintered at 1400° C. for 90 min, resulting in a $Ti_3AlC_2$ MAX phase fraction of about 70%, $Al_2O_3$ phase of about 20%, and nearly 10% other minor phases including TiC. Bulk density of the MAX phase composite prior to subsequent Al infiltration was low at about 2.8 g/cm$^3$ or about 65% the theoretical value. Subsequent Al infiltration was performed with additional Al present as infiltrating material, representing an excess of Al than needed. It was observed that this excess results in decreased MAX phase fraction.

The use of the "a" or "an" are employed to describe elements and components of the embodiments herein. This is done merely for convenience and to give a general sense of the description. This description should be read to include one or at least one and the singular also includes the plural unless it is obvious that it is meant otherwise.

"Comprising" as used herein means that various components, ingredients or steps that can be conjointly employed in practicing the present disclosure. Accordingly, the term "comprising" encompasses the more restrictive terms "consisting essentially of" and "consisting of." The present compositions can comprise, consist essentially of, or consist of any of the required and optional elements disclosed herein. The invention illustratively disclosed herein suitably may be practiced in the absence of any element or step which is not specifically disclosed herein.

All percentages, parts and ratios referred to herein are based on weight and all measurements made are at about 25° C., unless otherwise specified.

All ranges set forth herein include all possible subsets of ranges and any combinations of such subset ranges. By default, ranges are inclusive of the stated endpoints unless stated otherwise. Where a range of values is provided, it is understood that each intervening value between the upper and lower limit of that range and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also contemplated to be part of the disclosure.

It is expressly contemplated that for any number value described herein, e.g., as a parameter of the subject matter described or part of a range associated with the subject matter described, an alternative which forms part of the description is a functionally equivalent range surrounding the specific numerical value (e.g., for a dimension disclosed as "20 mm" an alternative embodiment contemplated is "about 40 mm"). Likewise, a value described by "about" expressly includes as an alternative embodiment the specific value itself (e.g., for an endpoint described as "about 40" an alternative embodiment contemplated is "40").

As used herein and unless specified otherwise, the terms "wt. %" and "wt %" are intended to refer to the composition of the identified element by weight of the entire article.

As used herein, the terms "substantially" or "essentially" refers to being largely but not necessarily wholly that which is specified, such as in an amount of at least about 80 wt. %, at least about 85 wt. %, at least about 90 wt. %, at least about 91 wt. %, at least about 92 wt. %, at least about 93 wt. %, at least about 94 wt. %, at least about 95 wt. %, at least about 96 wt. %, at least about 97 wt. %, at least about 98 wt. %, at least about 99 wt. %, or at least about 99.5 wt. % of the specified substance, or in a range of about 80-100 wt. %, about 90-100 wt. %, about 95-100 wt. %, about 96-100 wt. %, about 97-100 wt. %, about 98-100 wt. %, or about 99-100 wt. % of the specified substance.

As used herein, the term "consisting essentially of" refers to those elements required for a given embodiment. The term permits the presence of additional elements that do not materially affect the basic and novel or functional characteristic(s) of that embodiment of the invention.

The term "consisting of" as used herein refers to compositions, methods, and respective components thereof as described herein, which excludes any element, step, or ingredient not specified in the claim.

As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

As used herein the term "comprising" or "comprises" is used in reference to compositions, methods, and respective component(s) thereof, that are essential to the invention, yet open to the inclusion of unspecified elements, whether essential or not. Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components or process steps, the present technology also specifically includes embodiments consisting of, or consisting essentially of, such materials, components or processes excluding additional materials, components or processes (for consisting of) and excluding additional materials, components or processes affecting the significant properties of the embodiment (for consisting essentially of), even though such additional materials, components or processes are not explicitly recited in this application.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

"A" and "an" as used herein indicate "at least one" of the item is present; a plurality of such items may be present, when possible.

"About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. As used herein, the term "about" when used in connection with a value may refer to ±10% variation from the value. Other than in the operating examples, or where otherwise indicated, all numbers expressing quantities of ingredients or reaction conditions used herein should be understood as modified in all instances by the term "about."

As used herein, "about," "approximately," "essentially" and "substantially" are understood to refer to numbers in a range of numerals, for example the range of −10% to +10% of the referenced number, or −5% to +5% of the referenced number, or −1% to +1% of the referenced number, or −0.1% to +0.1% of the referenced number.

As used herein, the term "substantially no," "essentially free" or "substantially free" as used in reference to a particular component may mean that any of the component present constitutes less than 10% by weight, such as less than 9%, less than 8%, less than 7%, less than 6%, less than 5%, less than 4%, less than 3%, less than 2%, less than 1%, less than 0.5% or less than 0.1% by weight.

As used herein, and unless specified otherwise the term "partially" refers to a range of more than 0% and lower than 100%.

As used herein, the term "room temperature" may refer to a temperature in a range of 25° C.±5° C., or 25° C.±3° C.

As used herein, the term "substantially unchanged" by a process (e.g., reacting or heating) refers to a change in value of a characteristic of less than 20%. In embodiments, "substantially unchanged" refers to a change in value of a characteristic of less than 20%, less than 10%, less than 5%, less than 1%, less than 0.5%, or less than 0.1% relative to the value of the characteristic before the process.

As used herein, the term "and/or" includes any and all combinations of one or more of the associated listed items.

As used herein, the term "between" in the context of a range is inclusive of the two ends of the range, unless specified otherwise.

The abbreviation, "e.g.," or "i.e.," are used herein to indicate a non-limiting example. Thus, the abbreviation "e.g.," or "i.e.," is synonymous with the term "for example." Where used herein, the terms "example" and "such as," particularly when followed by a listing of terms, are merely exemplary and illustrative and should not be deemed to be exclusive or comprehensive.

First Set of Aspects

Aspects 1. A method for preparing a M-A-X containing MAX Phase composite, wherein M comprises one or more Group 3-7 transition metals, A is an A-group element, and X is C or N, the method comprising:

heating a precursor powder comprising a carbon source, an oxide of M, and one or both of a carbide and nitride of M to a pre-sintering temperature for pre-sintering the precursor powder to thereby form a pre-sintered precursor powder;

admixing the pre-sintered precursor powder with a powder comprising the A-group element;

forming the admixture into a discrete shape to thereby from a green body;

heating the green body at a co-sintering temperature for melt infiltration of the A-group element to thereby form a co-sintered preform; and performing reactive infiltration by heating the co-sintered preform i to an infiltration temperature suitable for transforming an infiltrating material comprising the A-group element provided in the presence of the co-sintered preform and/or unreacted A-group element present in the co-sintered preform to a molten state, wherein the molten infiltrating material and/or unreacted A-group element reacts with the co-sintered preform to thereby form the MAX Phase composite, wherein:

heating the precursor at the pre-sintering temperature partially reduces the oxide of M present in the precursor powder to an oxide of M capable of being wetted by the infiltrating materials, and the MAX Phase composite comprises an oxide of A and at least one MAX Phase compound having formula $M_{n+1}AX_n$, wherein n is 1-4.

Aspects 2. The method of aspect 1, wherein performing reactive infiltration comprises arranging the infiltrating material adjacent to the co-sintered preform-.

Aspects 3. The method of aspect 2, wherein the co-sintered preform is in the shape of a tube and the infiltrating material is in the shape of a tube having an inner diameter such that tube of the co-sintered preform can reside within the inner diameter of the tube of infiltrating material.

Aspects 4. The method of any one of aspects 2 to 3, wherein each of the co-sintered preform and the infiltrating material has a disk shape.

Aspects 5. The method of any one of the preceding aspects, wherein forming the admixture into the discrete shape comprises:

loading the admixture into a mold having the discrete shape; or forming the admixture into the discrete shape using an additive manufacturing process; or forming the admixture into the discrete shape using extrusion.

Aspects 6. The method of aspect 5, wherein the additive manufacturing process comprises 3D binder jet printing.

Aspects 7. The method of any one of the preceding aspects, wherein the infiltrating material is in direct contact with the co-sintered preform.

Aspects 8. The method of any one of the preceding aspects, wherein the infiltrating material is disposed above and below the co-sintered preform.

Aspects 9. The method of any one of the preceding aspects, comprising:

dip-coating the co-sintered preform in a molten bath of infiltrating material to form a coating of infiltrating material on the co-sintered preform before reactive infiltration; or casting a solid shell of the infiltrating material on the co-sintered preform before reactive infiltration.

Aspects 10. The method of any one of the preceding aspects, wherein reactive infiltration is performed with the co-sintered preform disposed on a support with an anti-stick powder disposed between the co-sintered preform and the support, wherein the anti-stick powder is a material that is stable at the infiltrating temperature and non-reactive with the infiltrating material in the molten state.

Aspects 11. The method of any one of the preceding aspects, further comprising:

forming the precursor powder into a first discrete shape for pre-sintering;

heating the first discrete shape to the pre-sintering temperature to pre-sinter the first discrete shape; and crushing the pre-sintered first discrete shape to form the pre-sintered precursor powder.

Aspects 12. The method of aspect 11, wherein forming the precursor powder into the first discrete shape comprises:

loading the precursor powder into a mold having the discrete shape and then forming into preform body by cold isostatic pressing; or forming the precursor powder into the discrete shape using an additive manufacturing process; or forming the precursor powder into the discrete shape using extrusion.

Aspects 13. The method of aspect 12, wherein the additive manufacturing process comprises 3D binder jet printing.

Aspects 14. The method of any one of aspects 11 to 13, wherein the pre-sintered precursor powder comprises carbon.

Aspects 15. The method of any one of aspects 11 to 14, wherein the pre-sintered precursor powder is substantially free of carbon.

Aspects 16. The method of any one of the preceding aspects, wherein the pre-sintering temperature is about 900-1500° C.

Aspects 17. The method of any one of the preceding aspects, wherein the co-sintering temperature is about 1300-1500° C.

Aspects 18. The method of any one of the preceding aspects, wherein the infiltration temperature is about 1300-1500° C.

Aspects 19. The method of any one of the preceding aspects, wherein M is one or more of tantalum (Ta), hafnium ($H_f$), titanium (Ti), vanadium (V), chromium (Cr), niobium (Nb), molybdenum (Mo), and zirconium (Zr).

Aspects 20. The method of any one of the preceding aspects, wherein M is titanium (Ti).

Aspects 21. The method of any one of the preceding aspects, wherein A is one or more of aluminum (Al), tin (Sn), silicon (Si), phosphorous (P), sulfur(S), gallium (Ga), germanium (Ge), arsenic (As), cadmium (Cd), indium (In), thallium (Tl), and lead (Pb).

Aspects 22. The method of any one of the preceding aspects, wherein A is aluminum.

Aspects 23. The method of any one of the preceding aspects, wherein X is C.

Aspects 24. The method of any one of the preceding aspects, wherein M is titanium (Ti), A is aluminum, X is C, and the Max Phase compound having formula $M_{n+1}AX_n$ is $Ti_3AlC_2$.

Aspects 25. The method of aspect 24, wherein the oxide of M in the precursor powder is $TiO_2$, the carbide and/or nitride of M is TiC, the carbon source is C, and wherein a molar ratio of the $TiC:TiO_2:C$ is in a range of about 6:0.5:0.2 to about 1:4:2, or wherein the molar ratio is about 4:2:1.

Aspects 26. The method of any one of the preceding aspects, wherein the carbide and/or nitride of M is present in a range of 20-90 wt. % by weight of the precursor powder.

Aspects 27. The method of any one of the preceding aspects, wherein the oxide of M is present in a range of about 5-50 wt. % by weight of the precursor powder.

Aspects 28. The method of any one of the preceding aspects, wherein the carbon source is present in a range of about 1-30 wt. % by weight of the precursor powder.

Aspects 29. The method of any one of the preceding aspects, wherein molar ratio of the carbide and/or nitride of M:the oxide of M:the carbon source in the precursor powder is in a range of 10:0.5:0.1 to about 1:6:3.

Aspects 30. The method of any one of the preceding aspects, wherein a molar ratio of the carbide and/or nitride of M:the oxide of M:the A-group element in the admixture is in a range of 10:1:2 to 1:5:6.

Aspects 31. The method of any one of the preceding aspects, wherein a weight ratio of the infiltrating material to the co-sintered preform is in a range of about 1:10 to about 10:1, or about 1:5 to about 6:5, or about 1:4 to about 1:1, or about 0.25 to about 0.82.

Aspects 32. The method of any one of the preceding aspects, further comprising a process of forming the precursor powder, the process comprising:

mixing and milling a composition having the carbide and/or nitride of M, the oxide of M, and the carbon source in a solvent to form a slurry;

drying the slurry to form a dried powder; and milling the dried powder to form the precursor powder.

Aspects 33. The method of aspect 32, wherein the solvent is an organic solvent selected from a group of a methanol, an ethanol, and an isopropyl alcohol.

Aspects 34. The method of aspect 32 or 33, wherein a weight ratio of the composition to the solvent is in a range of about 10:1 to about 1:10, or about 3:1 to about 1:5.

Aspects 35. The method of any one of the preceding aspects, wherein the co-sintered preform has pores having an average pore size in a range of about 0.1 to 10 μm.

Aspects 36. The method of any one of the preceding aspects, wherein the co-sintered preform has a porosity in a range of about 10-90%, or about 25-65%.

Aspects 37. The method of any one of the preceding aspects, wherein the precursor powder has an average particle size in a range of about 0.1-50 μm, or about 1-10 μm.

Aspects 38. The method of any one of the preceding aspects, wherein the carbide and/or nitride of M has an average particle size of about 0.1-50 μm, or about 1-10 μm, or about 1-5 μm.

Aspects 39. The method of any one of the preceding aspects, wherein the carbon source has an average particle size of about 0.1-50 μm, or about 1-10 μm, or about 5-10 μm.

Aspects 40. The method of any one of the preceding aspects, wherein heating the green body at the co-sintering temperature is performed for about 0.1-20 hours, or about 0.1-5 hours, or about 0.2-1.5 hours.

Aspects 41. The method of any one of the preceding aspects, wherein heating the green body at the co-sintering temperature is performed while flowing an inert gas.

Aspects 42. The method of aspect 41, wherein the inert gas is argon (Ar).

Aspects 43. The method of any one of the preceding aspects, wherein performing reactive infiltration comprises flowing an inert gas.

Aspects 44. The method of aspect 43, wherein the inert gas is argon (Ar).

Aspects 45. The method of any one of the preceding aspects, The method of claim 1, wherein an amount of A-group element admixed with the pre-sintered precursor powder is about ⅓ parts to 2 parts based on the total parts of the one or both of the carbide and nitride of M, and an amount of A-group element present in an infiltrating material provided in the presence of the co-sintered preform is about 0 parts to ⅔ parts based on the total parts of the one or both of the carbide and nitride of M.

Second Set of Aspects

Aspects 1. A method for preparing a M-A-X containing MAX Phase composite, wherein M comprises one or more Group 3-7 transition metals, A is an A-group element, and X is C or N, the method comprising:

forming a precursor powder into a discrete shape to thereby form a green body, wherein the precursor powder comprises a carbon source, an oxide of M, and one or both of a carbide and nitride of M;

heating the green body at a pre-sintering temperature to partially reduce the oxide of M present in the green body to thereby form a pre-sintered preform; and performing reactive infiltration by heating the pre-sintered preform in the presence of an infiltrating material comprising the A-group element to an infiltration temperature suitable for transforming the infiltrating material to a molten state, wherein the molten infiltrating material reacts with the pre-sintered preform to thereby form the MAX Phase composite, wherein:

heating the green body at the pre-sintering temperature partially reduces the oxide of M present in the green body to an oxide of M capable of being wetted by the infiltrating materials, and the MAX Phase composite comprises an oxide of A and at least one MAX Phase compound having formula $M_{n+1}AX_n$, wherein n is 1-4.

Aspects 2. The method of aspect 1, wherein performing reactive infiltration comprises arranging the infiltrating material between the pre-sintered preform and a sacrificial pre-sintered structure having a composition that is the same as the pre-sintered preform.

Aspects 3. The method of aspect 2, wherein the sacrificial pre-sintered structure has a disk shape.

Aspects 4. The method of aspect 3, wherein the pre-sintered preform is in the shape of a tube and the sacrificial pre-sintered structure having the disk shape is placed within a central aperture of the tube such that a gap is present between an inner surface of the tube and an outer surface of the sacrificial pre-sintered structure, and the gap is filled with the infiltrating material.

Aspects 5. The method of any one of aspects 2 to 4, wherein each of the pre-sintered preform and the infiltrating material has a disk shape, the infiltrating material is placed in between the pre-sintered preform and the sacrificial pre-sintered structure, and the method further comprises placing the anti-stick powder between the infiltrating material and the sacrificial pre-sintered structure.

Aspects 6. The method of any one of the preceding aspects, wherein forming the precursor powder into the discrete shape comprises:

loading the precursor powder into a mold having the discrete shape; or forming the precursor powder into the discrete shape using an additive manufacturing process; or forming the precursor powder into the discrete shape using extrusion.

Aspects 7. The method of aspect 6, wherein the additive manufacturing process comprises 3D binder jet printing.

Aspects 8. The method of any one of the preceding aspects, wherein the infiltrating material is in direct contact with the pre-sintered preform.

Aspects 9. The method of any one of the preceding aspects, wherein the infiltrating material covers at least one surface of the pre-sintered preform.

Aspects 10. The method of any one of the preceding aspects, comprising:

dip-coating the pre-sintered preform in a molten bath of infiltrating material to form a coating of infiltrating material on the pre-sintered preform before reactive infiltration; or casting a solid shell of the infiltrating material on the pre-sintered preform before reactive infiltration.

Aspects 11. The method of any one of the preceding aspects, wherein reactive infiltration is performed with the pre-sintered preform disposed on a support with an anti-stick powder disposed between the pre-sintered preform and the support, wherein the anti-stick powder is a material that is stable at the infiltrating temperature and non-reactive with the infiltrating material in the molten state.

Aspects 12. A method for preparing a M-A-X containing MAX Phase composite, wherein M comprises one or more Group 3-7 transition metals, A is an A-group element, and X is C or N, the method comprising:

forming a precursor powder into a first discrete shape to thereby form a green body, wherein the precursor powder comprises a carbon source, an oxide of M, and one or both of a carbide and nitride of M;

heating the green body at a pre-sintering temperature to partially reduce the oxide of M present in the green body to thereby form a pre-sintered preform;

crushing the pre-sintered preform into a pre-sintered preform powder;

admixing the pre-sintered preform powder with an infiltrating material powder and forming the admixture into a second discrete shape, wherein the infiltrating material powder comprises the A-group element; and performing reactive infiltration by heating the second discrete shape to an infiltration temperature suitable for transforming the infiltrating material to a molten state, wherein the molten infiltrating material reacts with the pre-sintered preform powder in the second discrete shape to thereby form the MAX Phase composite, wherein:

heating the green body at the pre-sintering temperature partially reduces the oxide of M present in the green body to an oxide of M capable of being wetted by the infiltrating material, the pre-sintered preform powder comprises oxide of M capable of being wetted by the infiltrating material, and one or both of the carbide and nitride of M, and the MAX Phase composite comprises an oxide of A and a MAX Phase compound having the formula $M_{n+1}AX_n$, wherein n is 1-4.

Aspects 13. The method of aspect 12, wherein forming the precursor powder into the first discrete shape and/or forming the pre-sintered preform powder into the second discrete shape comprises:

loading the precursor powder into a mold having the discrete shape; or forming the precursor powder into the discrete shape using an additive manufacturing process; or forming the precursor powder into the discrete shape using extrusion.

Aspects 14. The method of aspect 13, wherein the additive manufacturing process comprises 3D binder jet printing.

Aspects 15. The method of any one of aspects 12 to 14, wherein the pre-sintered preform powder comprises carbon.

Aspects 16. The method of any one of aspects 12 to 15, wherein the pre-sintered preform powder is substantially free of carbon.

Aspects 17. The method of any one of aspects 12 to 16, wherein performing reactive infiltration is performed with the second discrete shape disposed on a support with an anti-stick powder disposed between the second discrete shape and the support, wherein the anti-stick powder is a material that is stable at the infiltration temperature and non-reactive with the infiltrating material in the molten state.

Aspects 18. The method of aspect 11 or 17, wherein the anti-stick powder is an oxide of A.

Aspects 19. The method of aspect 18, wherein the anti-stick powder is alumina

Aspects 20. The method of any one of aspects 11 or 17 to 19, wherein the anti-stick powder has an average particle size of about 0.1 µm to 200 µm.

Aspects 21. The method of any one of the preceding aspects, wherein the pre-sintering temperature is about 900-1500° C.

Aspects 22. The method of any one of the preceding aspects, wherein the infiltration temperature is about 1300-1500° C.

Aspects 23. The method of any one of the preceding aspects, wherein M is one or more of tantalum (Ta), hafnium $(H_f)$, titanium (Ti), vanadium (V), chromium (Cr), niobium (Nb), molybdenum (Mo), and zirconium (Zr).

Aspects 24. The method of any one of the preceding aspects, wherein M is titanium (Ti).

Aspects 25. The method of any one of the preceding aspects, wherein A is one or more of aluminum (Al), tin (Sn), silicon (Si), phosphorous (P), sulfur(S), gallium (Ga), germanium (Ge), arsenic (As), cadmium (Cd), indium (In), thallium (TI), and lead (Pb).

Aspects 26. The method of any one of the preceding aspects, wherein A is aluminum.

Aspects 27. The method of any one of the preceding aspects, wherein X is C.

Aspects 28. The method of any one of the preceding aspects, wherein M is titanium (Ti), A is aluminum, X is C, and the Max Phase compound having formula $M_{n+1}AX_n$ is $Ti_3AlC_2$.

Aspects 29. The method of aspect 28, wherein the oxide of M in the precursor powder is $TiO_2$, the carbide and/or nitride of M is TiC, the carbon source is C, and wherein a molar ratio of the $TiC:TiO_2:C$ is in a range of about 6:0.5:0.2 to about 1:4:2, or wherein the molar ratio is about 4:2:1.

Aspects 30. The method of any one of the preceding aspects, wherein the carbide and/or nitride of M is present in a range of 20-90 wt. % by weight of the precursor powder.

Aspects 31. The method of any one of the preceding aspects, wherein the oxide of M is present in a range of about 5-50 wt. % by weight of the precursor powder.

Aspects 32. The method of any one of the preceding aspects, wherein the carbon source is present in a range of about 1-30 wt. % by weight of the precursor powder.

Aspects 33. The method of any one of the preceding aspects, wherein molar ratio of the carbide and/or nitride of M:the oxide of M:the carbon source is in a range of 10:0.5:0.1 to about 1:6:3.

Aspects 34. The method of any one of the preceding aspects, further comprising a process of forming the precursor powder, the process comprising:

mixing and milling a composition having the carbide and/or nitride of M, the oxide of M, and the carbon source in a solvent to form a slurry;

drying the slurry to form a dried powder; and milling the dried powder to form the precursor powder.

Aspects 35. The method of aspect 34, wherein the solvent is an organic solvent selected from a group of a methanol, an ethanol, and an isopropyl alcohol.

Aspects 36. The method of aspect 34 or 35, wherein a weight ratio of the composition to the solvent is in a range of about 10:1 to about 1:10, or about 3:1 to about 1:5.

Aspects 37. The method of any one of the preceding aspects, wherein the pre-sintered preform has pores having an average pore size in a range of about 0.1 to 10 µm.

Aspects 38. The method of any one of the preceding aspects, wherein the pre-sintered preform has a porosity in a range of about 10-90%, or about 25-65%.

Aspects 39. The method of any one of the preceding aspects, wherein the precursor powder has an average particle size in a range of about 0.1-50 µm, or about 1-10 µm.

Aspects 40. The method of any one of the preceding aspects, wherein the carbide and/or nitride of M has an average particle size of about 0.1-50 µm, or about 1-10 µm, or about 1-5 µm.

Aspects 41. The method of any one of the preceding aspects, wherein the carbon source has an average particle size of about 0.1-50 µm, or about 1-10 µm, or about 5-10 µm.

Aspects 42. The method of any one of the preceding aspects, wherein heating the green body at the pre-sintering temperature is performed for about 0.1-20 hours, or about 0.1-5 hours, or about 0.2-1.5 hours.

Aspects 43. The method of any one of the preceding aspects, wherein heating the green body at the pre-sintering temperature is performed while flowing an inert gas.

Aspects 44. The method of aspect 43, wherein the inert gas is argon (Ar).

Aspects 45. The method of any one of the preceding aspects, wherein a weight ratio of the infiltrating material to the pre-sintered preform is in a range of about 1:10 to about 10:1, or about 1:5 to about 6:5, or about 1:4 to about 1:1, or about 0.25 to about 0.82.

Aspects 46. The method of any one of the preceding aspects, wherein performing reactive infiltration comprises flowing an inert gas.

Aspects 47. The method of aspect 46, wherein the inert gas is argon (Ar).

Aspects 48. The method of any one of the preceding aspects, wherein performing reactive infiltration is conducted at about 1300-1500° C. for about 1-5 hours.

Aspects 49. The method of any one of the preceding aspects, wherein the MAX Phase compound having formula $M_{n+1}AX_n$ is present in a range of about 25-95 wt. %, or about 50-70 wt. %, or about 60-65 wt. % by weight of the MAX Phase composite.

Aspects 50. The method of any one of the preceding aspects, wherein the MAX Phase compound having formula $M_{n+1}AX_n$ is present as crystalline grains.

Aspects 51. The method of aspect 50, wherein the MAX Phase compound having formula $M_{n+1}AX_n$ is $Ti_3AlC_2$, and the crystalline grains are plate shaped grains of about 1-50 μm or about 5-10 μm in length and about 1-10 μm or about 2-3 μm in thickness.

Aspects 52. The method of any of one of the preceding aspects, wherein the oxide of A has an average particle size of about 0.1-50 μm, about 1-10 μm, or about 2-5 μm.

Aspects 53. The method of any one of the preceding aspects, wherein the oxide of A is present in a range of about 5-40 wt. %, about 10-30 wt. %, or about 15-20 wt. %, or about 16 wt. % by weight of the MAX Phase composite.

Aspects 54. The method of any one of the preceding aspects, wherein the MAX Phase compound having formula $M_{n+1}AX_n$ is $Ti_3AlC_2$, and the oxide of A is $Al_2O_3$, and the MAX Phase composite further comprises $TiAl_3$.

Aspects 55. The method of aspect 54, wherein the MAX Phase composite further comprises metal Al.

Aspects 56. The method of aspect 55, wherein $Ti_3AlC_2$ is present in a range of about 20-95 wt. %, or about 50-70 wt. %, $TiAl_3$ is present in a range of about 5-40 wt. % or about 10-30 wt. %, $Al_2O_3$ is present in a range of about 5-30 wt. % or 10-25 wt. %, and Al is present in a range of about 1-25 wt. % or 5-15 wt. %, each by weight of the MAX Phase composite.

Aspects 57. The method of aspect 56, wherein the MAX Phase composite has less than about 10 wt. %, or less than about 5 wt. %, or less than about 1 wt. % of TiC, or is substantially free of TiC.

Aspects 58. The method of any one of the preceding aspects, wherein the MAX Phase composite has less than about 10 wt. %, or less than about 5 wt. %, or less than about 1 wt. % of the carbide and/or nitride of M, or is substantially free of the carbide and/or nitride of M.

Aspects 59. The method of any one of the preceding aspects, wherein the MAX Phase composite has an oxidizing resistance in an oxidizing atmosphere at a temperature of at least 1400° C., 1500° C., 1600° C., or 2000° C.

Aspects 60. The method of any one of the preceding aspects, wherein the MAX Phase composite has a porosity less than 30 vol. %, or in a range of about 0-30 vol. %.

Aspects 61. The method of any one of the preceding aspects, wherein the MAX Phase composite is substantially free of micro-cracks.

Aspects 62. The method of any one of the preceding aspects, wherein the pre-sintered preform comprises the carbon source.

Aspects 63. The method of any one of the preceding aspects, wherein the pre-sintered preform is substantially free of the carbon source.

Aspects 64. A method for preparing a Ti-Al-C containing MAX Phase composite, comprising:

forming a precursor powder into a discrete shape to thereby form a green body, wherein the precursor powder comprises a carbon source, $TiO_2$, and TiC;

heating the green body at a pre-sintering temperature and under conditions to partially reduce the $TiO_2$ present in the green body to $Ti_2O_3$, to thereby form a pre-sintered preform; and performing reactive infiltration by heating the pre-sintered preform in the presence of an infiltrating material formed of Al to an infiltration temperature suitable for transforming the infiltrating material to a molten state, wherein the molten infiltrating material reacts with the pre-sintered preform to thereby form the MAX Phase composite, wherein the MAX Phase composite comprises (i) a MAX Phase compound selected from one or more of $Ti_3AlC_2$ and $Ti_2AlC$ and (ii) $Al_2O_3$.

Aspects 65. The method of aspect 64, wherein performing reactive infiltration comprises arranging the infiltrating material between the pre-sintered preform and a sacrificial pre-sintered structure having the same composition as the pre-sintered preform.

Aspects 66. The method of aspect 64 or 65, wherein performing reactive infiltration is performed with the pre-sintered preform disposed on a support with an $Al_2O_3$ powder disposed between the pre-sintered preform and the support.

Aspects 67. A method for preparing a Ti-Al-C containing MAX Phase composite, comprising:

forming a precursor powder into a first discrete shape to thereby form a green body, wherein the precursor powder comprises a carbon source, $TiO_2$, and TIC;

heating the green body at a pre-sintering temperature and under conditions to partially reduce the $TiO_2$ present in the green body to $Ti_2O_3$, to thereby form a pre-sintered preform;

crushing the pre-sintered preform into a pre-sintered preform powder comprising $Ti_2O_3$, and TiC;

admixing the pre-sintered preform powder with aluminum powder and forming the admixture into a second discrete shape; and performing reactive infiltration by heating the second discrete shape to an infiltration temperature suitable for transforming the aluminum to a molten state, wherein the molten aluminum reacts with the pre-sintered preform powder to thereby form the MAX Phase composite, wherein the MAX Phase composite comprises (i) a MAX Phase compound selected from one or more of $Ti_3AlC_2$ and $Ti_2AlC$ and (ii) $Al_2O_3$.

Aspects 68. The method of aspect 67, wherein performing reactive infiltration is performed with the second discrete shape disposed on a support with an $Al_2O_3$ powder disposed between the second discrete shape and the support.

Aspects 69. The method of aspect 67 or 68, wherein the pre-sintered preform powder further comprises carbon.

Aspects 70. The method of any one of aspects 67 to 69, wherein the pre-sintered preform powder is substantially free of carbon.

The foregoing description is given for clearness of understanding only, and no unnecessary limitations should be understood therefrom, as modifications within the scope of the disclosure may be apparent to those having ordinary skill in the art.

All patents, publications and references cited herein are hereby fully incorporated by reference. In case of conflict between the present disclosure and incorporated patents, publications and references, the present disclosure should control.

Still further, the figures depict embodiments for purposes of illustration only. One of ordinary skill in the art will readily recognize from the following discussion that alternative embodiments of the structures and methods illustrated herein may be employed without departing from the principles described herein.

Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for preparing a M-A-X containing MAX Phase composite, wherein M comprises one or more Group 3-7 transition metals, A is an A-group element, and X is C or N, the method comprising:

heating a precursor powder comprising a carbon source, an oxide of M, and one or both of a carbide and nitride of M to a pre-sintering temperature for pre-sintering the precursor powder to thereby form a pre-sintered precursor powder;

admixing the pre-sintered precursor powder with a powder comprising the A-group element;

forming the admixture into a discrete shape to thereby from a green body;

heating the green body at a co-sintering temperature for melt infiltration of the A-group element to thereby form a co-sintered preform; and performing reactive infiltration by heating the co-sintered preform to an infiltration temperature suitable for transforming an infiltrating material comprising the A-group element provided in the presence of the co-sintered preform and/or unreacted A-group element present in the co-sintered preform to a molten state, wherein the molten infiltrating material and/or unreacted A-group element reacts with the co-sintered preform to thereby form the MAX Phase composite, wherein:

heating the precursor at the pre-sintering temperature partially reduces the oxide of M present in the precursor powder to an oxide of M capable of being wetted by the infiltrating materials, and the MAX Phase composite comprises an oxide of A and at least one MAX Phase compound having formula $M_{n+1}AX_n$, wherein n is 1-4.

2. The method of claim 1, wherein an amount of A-group element admixed with the pre-sintered precursor powder is about ⅓ parts to 2 parts based on the total parts of the one or both of the carbide and nitride of M, and an amount of A-group element present in an infiltrating material provided in the presence of the co-sintered preform is about 0 parts to ⅘ parts based on the total parts of the one or both of the carbide and nitride of M.

3. The method of claim 1, wherein performing reactive infiltration comprises arranging the infiltrating material adjacent to the co-sintered preform.

4. The method of claim 1, wherein forming the admixture into the discrete shape comprises:

loading the admixture into a mold having the discrete shape; or forming the admixture into the discrete shape using an additive manufacturing process; or forming the admixture into the discrete shape using extrusion.

5. The method of claim 1, wherein the infiltrating material is in direct contact with the co-sintered preform.

6. The method of claim 1, comprising:

dip-coating the co-sintered preform in a molten bath of infiltrating material to form a coating of infiltrating material on the co-sintered preform before reactive infiltration; or casting a solid shell of the infiltrating material on the co-sintered preform before reactive infiltration.

7. The method of claim 1, further comprising:

forming the precursor powder into a first discrete shape for pre-sintering;

heating the first discrete shape to the pre-sintering temperature to pre-sinter the first discrete shape; and crushing the pre-sintered first discrete shape to form the pre-sintered precursor powder.

8. The method of claim 7, wherein forming the precursor powder into the first discrete shape comprises:

loading the precursor powder into a mold having the discrete shape and then forming into preform body by cold isostatic pressing; or forming the precursor powder into the discrete shape using an additive manufacturing process; or forming the precursor powder into the discrete shape using extrusion.

9. The method of claim 1, wherein the pre-sintering temperature is about 900-1500° C.

10. The method of claim 1, wherein the co-sintering temperature is about 1300-1500° C.

11. The method of claim 1, wherein the infiltration temperature is about 1300-1500° C.

12. The method of claim 1, wherein M is one or more of tantalum (Ta), hafnium (H$_f$), titanium (Ti), vanadium (V), chromium (Cr), niobium (Nb), molybdenum (Mo), and zirconium (Zr).

13. The method of claim 1, wherein A is one or more of aluminum (Al), tin (Sn), silicon (Si), phosphorous (P), sulfur(S), gallium (Ga), germanium (Ge), arsenic (As), cadmium (Cd), indium (In), thallium (Tl), and lead (Pb).

14. The method of claim 1, wherein M is titanium (Ti), A is aluminum, X is C, and the Max Phase compound having formula $M_{n+1}AX_n$ is $Ti_3AlC_2$.

15. The method of claim 14, wherein the oxide of M in the precursor powder is $TiO_2$, the carbide and/or nitride of M is TiC, the carbon source is C, and wherein a molar ratio of the $TiC:TiO_2:C$ is in a range of about 6:0.5:0.2 to about 1:4:2, or wherein the molar ratio is about 4:2:1.

16. The method of claim 1, wherein a molar ratio of the carbide and/or nitride of M:the oxide of M:the A-group element in the admixture is in a range of 10:1:2 to 1:5:6.

17. The method of claim 1, further comprising a process of forming the precursor powder, the process comprising:

mixing and milling a composition having the carbide and/or nitride of M, the oxide of M, and the carbon source in a solvent to form a slurry;

drying the slurry to form a dried powder; and milling the dried powder to form the precursor powder.

18. The method of claim 1, comprising flowing an inert gas while heating the green body at the co-sintering temperature and/or performing reactive infiltration.

19. A method for preparing a M-A-X containing MAX Phase composite, wherein M comprises one or more Group 3-7 transition metals, A is an A-group element, and X is C or N, the method comprising:

forming a precursor powder into a discrete shape to thereby form a green body, wherein the precursor powder comprises a carbon source, an oxide of M, and one or both of a carbide and nitride of M;

heating the green body at a pre-sintering temperature to partially reduce the oxide of M present in the green body to thereby form a pre-sintered preform; and performing reactive infiltration by heating the pre-sintered preform in the presence of an infiltrating material comprising the A-group element to an infiltration temperature suitable for transforming the infiltrating material to a molten state, wherein the molten infiltrating material reacts with the pre-sintered preform to thereby form the MAX Phase composite, wherein:

heating the green body at the pre-sintering temperature partially reduces the oxide of M present in the green body to an oxide of M capable of being wetted by the infiltrating materials, and the MAX Phase composite comprises an oxide of A and at least one MAX Phase compound having formula $M_{n+1}AX_n$, wherein n is 1-4.

20. A method for preparing a M-A-X containing MAX Phase composite, wherein M comprises one or more Group 3-7 transition metals, A is an A-group element, and X is C or N, the method comprising:

forming a precursor powder into a first discrete shape to thereby form a green body, wherein the precursor powder comprises a carbon source, an oxide of M, and one or both of a carbide and nitride of M;

heating the green body at a pre-sintering temperature to partially reduce the oxide of M present in the green body to thereby form a pre-sintered preform;

crushing the pre-sintered preform into a pre-sintered preform powder;

admixing the pre-sintered preform powder with an infiltrating material powder and forming the admixture into a second discrete shape, wherein the infiltrating material powder comprises the A-group element; and performing reactive infiltration by heating the second discrete shape to an infiltration temperature suitable for transforming the infiltrating material to a molten state, wherein the molten infiltrating material reacts with the pre-sintered preform powder in the second discrete shape to thereby form the MAX Phase composite, wherein:

heating the green body at the pre-sintering temperature partially reduces the oxide of M present in the green body to an oxide of M capable of being wetted by the infiltrating material, the pre-sintered preform powder comprises oxide of M capable of being wetted by the infiltrating material, and one or both of the carbide and nitride of M, and the MAX Phase composite comprises an oxide of A and a MAX Phase compound having the formula $M_{n+1}AX_n$, wherein n is 1-4.

* * * * *